United States Patent [19]
Piotrowski et al.

[11] Patent Number: 6,056,005
[45] Date of Patent: May 2, 2000

[54] VENT VALVE WITH LIQUID SEAL

[75] Inventors: Thomas C. Piotrowski, West Chicago, Ill.; Martin Clift, Vacaville, Calif.; Baohai Liu, Carol Stream, Ill.

[73] Assignee: The Protectoseal Company, Bensenville, Ill.

[21] Appl. No.: 08/968,609

[22] Filed: Nov. 13, 1997

[51] Int. Cl.[7] .............................. F16K 13/10; F16K 17/26
[52] U.S. Cl. ................ 137/248; 137/247.25; 137/493.8; 137/559
[58] Field of Search ......................... 137/247.15, 247.25, 137/248, 493.8, 559

[56] References Cited

U.S. PATENT DOCUMENTS

| | | | |
|---|---|---|---|
| 266,485 | 10/1882 | Lightbody | 137/247.25 X |
| 618,913 | 2/1899 | Smith | 137/248 |
| 1,102,549 | 7/1914 | Rumpf | 137/248 |
| 1,529,818 | 3/1925 | Tuttle | 137/248 |
| 1,589,026 | 6/1926 | Wilson | 137/248 |
| 1,651,051 | 11/1927 | Wiggins | 137/251.1 |
| 2,367,158 | 1/1945 | Ulm | 137/251.1 |
| 2,384,147 | 9/1945 | Wiggins | 137/248 |
| 2,413,804 | 1/1947 | Ulm | 137/248 |
| 2,527,892 | 10/1950 | Quist | 137/248 |
| 2,575,574 | 11/1951 | Withrow et al. | 137/251.1 |
| 2,704,088 | 3/1955 | Nerem | 137/248 |
| 2,929,335 | 3/1960 | Seiler | 137/251.1 X |
| 3,394,732 | 7/1968 | Lisciani | 137/533.21 |
| 4,326,556 | 4/1982 | Deutsch et al. | 137/240 |
| 4,502,500 | 3/1985 | Upton | 137/247.25 |
| 4,724,857 | 2/1988 | Taylor | 137/67 |
| 4,773,441 | 9/1988 | Biba | 137/247.25 |
| 4,787,409 | 11/1988 | Taylor | 137/67 |
| 4,977,918 | 12/1990 | Taylor | 137/70 |
| 5,116,089 | 5/1992 | Taylor | 292/78 |
| 5,273,065 | 12/1993 | Taylor | 137/70 |

*Primary Examiner*—John Rivell
*Attorney, Agent, or Firm*—Olson & Hierl, Ltd.

[57] ABSTRACT

A vent valve is provided wherein a pallet/diaphragm type valve is cooperatively and coactively associated with a pressure responsive liquid seal. The assembly eliminates low level fugitive vapor emissions escaping from the diaphragm/seat region up to a predeterminable liquid seal set pressure which preferably is less than or equal to the set pressure for diaphragm opening. A liquid reservoir with a sealed chamber is provided for the liquid seal subassembly. Fugitive emissions from a tank or the like that is associated with the vent valve enter the sealed chamber and are there contained until the pressure therein is sufficient to displace the sealing liquid to an extent sufficient to open the sealed chamber. The valve assembly can be used as a pressure vent, as a vacuum vent, and as a combination pressure and vacuum vent. Optional features, such as a constant liquid level controller, a sight glass, a signaling device, or the like can be provided.

13 Claims, 13 Drawing Sheets

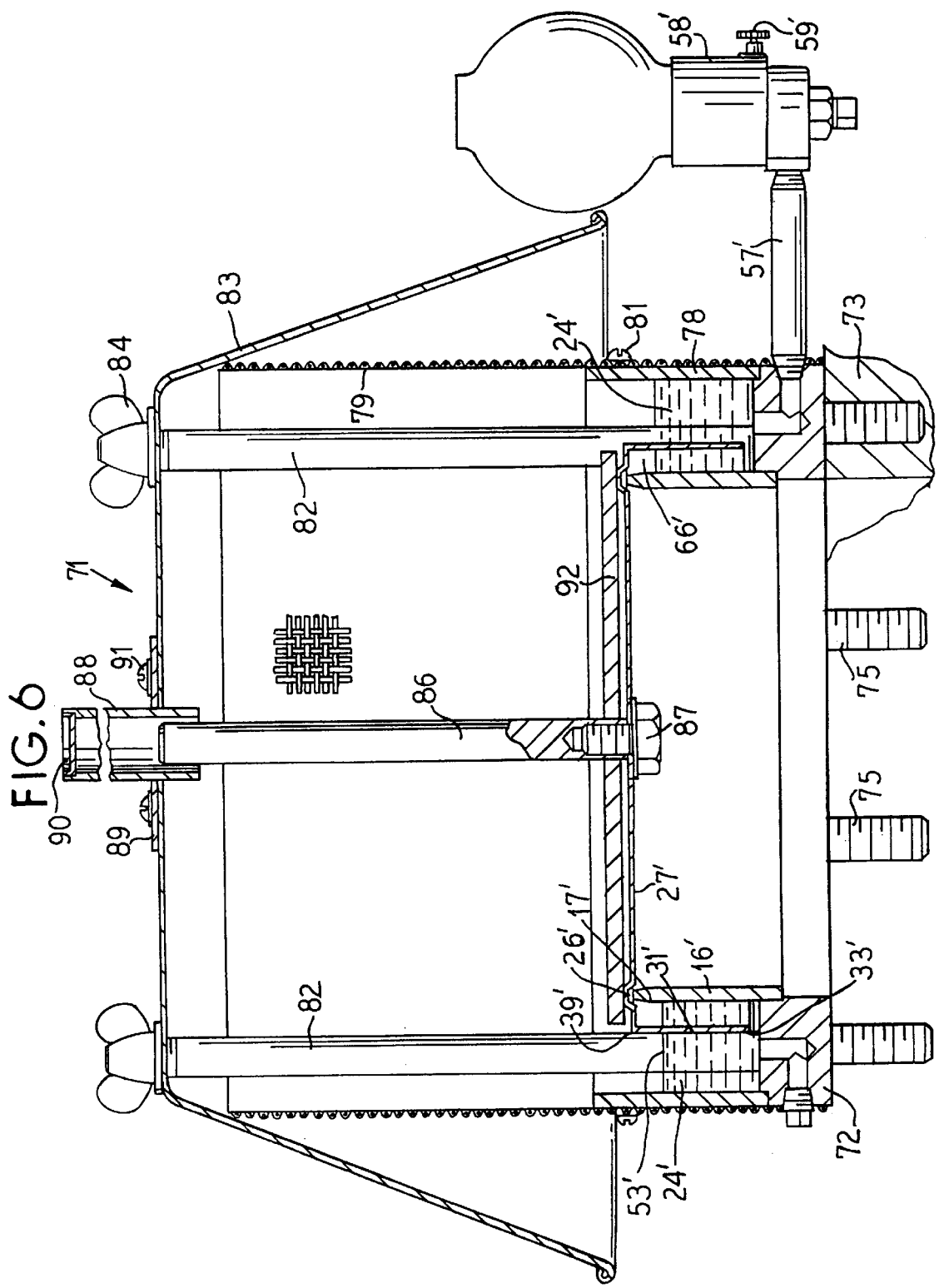

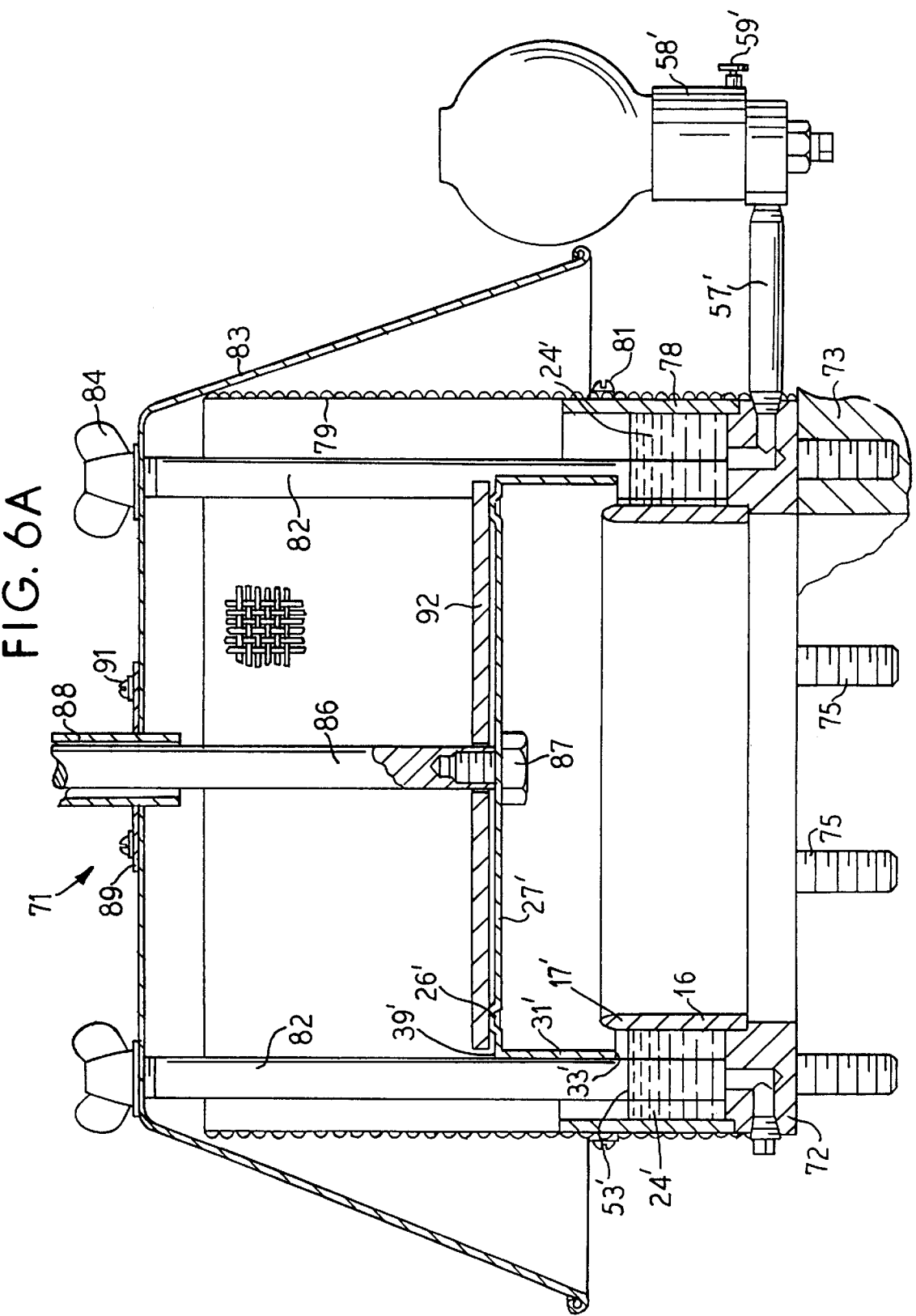

VENT VALVE WITH LIQUID SEAL

FIELD OF THE INVENTION

This invention relates to vent valves which reduce low level fugitive vapor emissions prior to valve opening.

BACKGROUND OF THE INVENTION

An opening or vent is commonly provided in a tank (such as a reactor, a processing device, a storage tank, a gas holder or other vessel) for the discharge, or the release, of an undesirably large pressure differential relative to the adjacent environment. To regulate use or operation of the tank, avoid material loss from the tank, prevent damage to the tank, and/or minimize or even prevent environmental contamination with material from the tank, such a vent is commonly provided with a vent valve that opens at a preset pressure differential.

While various vent valve structures are known, one particularly effective structure utilizes a combination of pallet and diaphragm. The pallet in normal valve operation extends across and closes the valve mouth while the associated diaphragm seats about and seals the valve mouth. Various means are known for regulating the opening or set pressure of such a vent valve where the pallet and diaphragm combination separates from the valve mouth. For example, one particularly effective pressure regulating means comprises a weight that is loaded onto the upper outside surface of the pallet. Thus, in such an arrangement, the weight-loaded diaphragm separates from its associated seat at a preset tank pressure (which can be superatmospheric or subatmospheric), thereby to achieve vent valve opening.

However, one problem with such a pallet and diaphragm-type vent valve is that a small volume of fugitive vapor emissions (typically parts per million) may occur between the diaphragm and its seat before the set diaphragm opening pressure of the vent valve is reached.

The present invention overcomes this problem by providing a liquid seal that is cooperatively associated with a pallet and diaphragm-type vent valve. The liquid seal functions to virtually eliminate the escape of all fugitive vapor emissions prior to the opening of the pallet and diaphragm combination at a set opening pressure.

SUMMARY OF THE INVENTION

More particularly, this invention relates to a vent valve structure comprising an integral and coacting combination of a pressure responsive pallet and diaphragm-type valve with a pressure-responsive liquid seal.

The valve and the liquid seal that are incorporated into the combination structure operate cooperatively. The structural combination functions so that the liquid seal eliminates the escape of low level fugitive vapor emissions from the pallet and diaphragm-type valve structure prior to valve opening at a set pressure.

The inventive vent valve structure also incorporates a cooperating vent neck which is generally provided with a flange means for associating the vent valve structure with a tank or the like. Depending upon the arrangement of the components employed in a particular embodiment of the valve structure, the inventive vent valve structure can be used for relief of pressure in a tank holding either sub- or superatmospheric pressures.

In the inventive vent valve combination, the diaphragm supporting pallet cooperates with the incorporated liquid seal. The liquid seal has a sealing liquid reservoir with a normally closed chamber that is located over a portion of the surface of a sealing liquid in the reservoir and is adjacent to the vent neck. A side wall region of the closed chamber is defined by a baffle or apron that circumferentially extends around the vent neck and is suspended preferably vertically from the pallet. The apron extends down into the reservoir and has a lower end region that normally terminates below the surface of the sealing liquid in the reservoir.

When the inventive vent valve structure is adapted for use with a tank holding superatmospheric pressures, the reservoir is preferably circumferentially positioned about the outside of the vent neck, and any small volume of fugitive vapor emissions that leaks past the contact seal existing between the normally closed valve diaphragm and the valve neck enters the closed chamber. The liquid seal between the reservoir liquid and the apron lower end region does not allow vapor emissions that enter the closed chamber to escape and reach the atmosphere (that is, the environment).

The diaphragm opening or set point pressure is independent in operation from the opening of the liquid seal. If and when the leakage of fugitive vapor emissions increases (perhaps caused by tank pressure increase), the pressure in the closed chamber increases. The increase causes the reservoir liquid in the closed chamber to be displaced downwardly and to move into an adjacent reservoir region, but the seal is maintained. Eventually the pressure can increase to a level which is in excess of the maximum displacable liquid head in the closed chamber. This level defines the maximum liquid seal pressure of the closed chamber.

When the vent valve structure is adapted for use with a vacuum tank (that is, a tank holding subatmospheric pressures), the reservoir is preferably positioned on the inside of the vent valve structure.

The subassembly of the diaphragm and its associated pallet are associated with pressure regulating means that permit the diaphragm to lift (that is, open and separate) from its neck-associated seating surface at a set point which is at or below the maximum liquid seal holding pressure. The inventive vent valve assembly is leak free until the diaphragm and pallet subassembly lifts from the seat at the set point.

The inventive vent valve structure can optionally be associated with various auxiliary subassemblies, such as a constant level sealing liquid supply source, and/or a sight glass to detect the presence of water in the reservoir if the reservoir liquid used has a greater density than water and is immiscible with water, and/or a signaling device (which preferably can be remotely sensed).

The opening of the diaphragm and pallet subassembly is based upon the tank pressures applied to the pallet. When such opening occurs, the apron is separated from the reservoir sealing liquid and tank pressure is vented to the atmosphere.

The inventive vent valve structure can be associated with a tank to provide tank venting when the tank internal pressure exceeds a set pressure that is either superatmospheric or subatmospheric. For example, an embodiment of the inventive vent valve structure can be associated with a tank operating at superatmospheric pressures and another embodiment can be associated with a tank operating at subatmospheric pressures, and both vent valve embodiments can be associated with a tank that operates over time either at superatmospheric pressures or at subatmospheric pressures.

Various features of the inventive vent valve structure are discussed and disclosed in the following description.

Other features, objects, advantages, aims, embodiments, applications and the like will be apparent to those skilled in the art from the present description taken with the accompanying drawings and the appended claims.

BRIEF DESCRIPTION OF THE DRAWINGS

In the drawings:

FIG. 6 is a view similar to FIG. 1, but shows a second embodiment of a pressure responsive vent valve structure of this invention;

FIG. 6A is a view similar to FIG. 6, but shows this valve embodiment in its valve open configuration;

DETAILED DESCRIPTION

Figure 1:
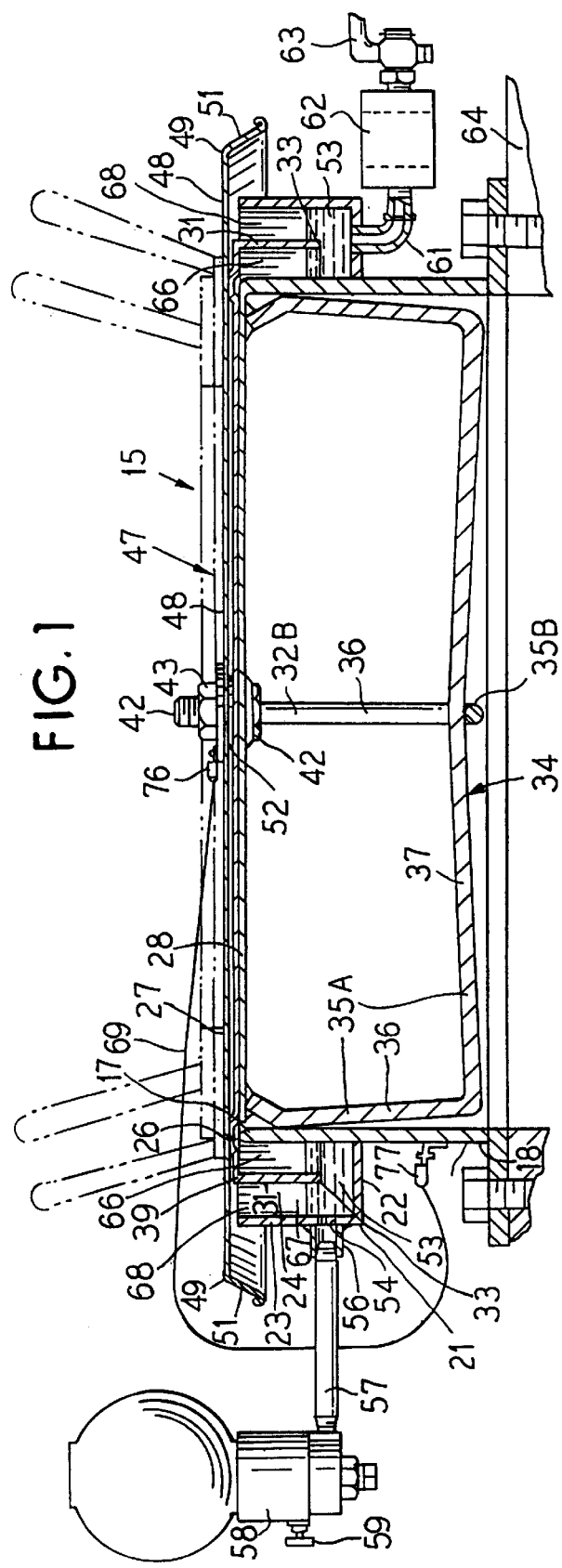
FIG. 1 is an axial and diametrical cross-sectional view taken through one embodiment of a superatmospheric pressure-responsive vent valve structure of the present invention, the valve structure being shown in connected association with a (fragmentarily shown) tank that is being operated at superatmospheric pressure.

Referring to the drawings, FIGS. 1–5 show an embodiment 15 of the inventive liquid-seal equipped, pallet and diaphragm-equipment vent valve assembly. The vent valve assembly 15 incorporates a vent neck 16 which is conventionally cylindrical in configuration and which has an outer end 17 and an inner end 18 and which is preferably comprised of steel or other metal alloy. The outer end 17 is typically machined so as to provide a uniform, circumferentially extending seating surface. The inner end 18 is provided with mounting means for a tank 64 upper portion or the like, as desired. Here, illustratively, vent neck 16 has a radially outwardly extending mounting flange 19 associated therewith by welding or the like, and the flange 19 is illustratively but conventionally associated with the vent rim portion of a tank 64 with a seal and nut and bolt assemblies.

The vent neck 16 is here associated with a circumferentially extending member 21 which is generally L-configured. Member 21 has a laterally extending base leg 22 and an upstanding leg 23. The terminal end of base leg 22 is connected abuttingly (preferably by welding) to circumferential outside portions of vent neck 16. Leg 22 extends circumferentially about and in radially outwardly extending relationship to the vent neck 16. Upstanding leg 23 extends circumferentially in radially and preferably uniformly spaced relationship about outside portions of vent neck 16. Thus, member 21 and vent neck 16 cooperate to define a sealing liquid holding reservoir 24 that circumferentially extends about the outside of the neck 16 in longitudinally and preferably equally spaced but adjacent relationship to the outer end 17. Those skilled in the art will readily appreciate that the member 21 can have various configurations and that the reservoir 24 can be defined by various means and have various sizes.

The vent valve assembly 15 includes a circumferentially and continuously extending diaphragm 26 that is releasably seated over the outer end 17 when the valve assembly 15 is in its normal diaphragm 26 closed position (as shown in FIG. 1).

A pallet plate subassembly 47 is provided that supports and is associated with the diaphragm 26. Pallet plate subassembly 47 cooperates with the diaphragm 26 to provide a closure for the outer end 17 and normally closes the neck 16 at outer end 17. Subassembly 47 extends diametrically across the outer end 17. Preferably and as shown, the pallet plate subassembly 47 here comprises a generally centrally flattened circular top plate 27 and a circular bottom plate 28 that are in adjacent interfacial relationship with one another, and that have coaxial respective centers. The bottom plate 28 is disposed generally within, across and adjacent to a major portion of the opening defined by the outer end 17. The top plate 27 extends over and radially beyond the end 17, and the plate 27 has a larger diameter than the bottom plate 28. Preferably the bottom plate 28 radially extends over a portion of the diaphragm 26 so as to aid in retaining the diaphragm 26 in its desired location. The plates 28 and 27 are each conveniently formed of a metal such as steel or aluminum.

In radially inwardly spaced but adjacent relationship to the outer perimeter 39 of the top plate 27, the top plate 27 has defined on its bottom surface a circumferentially extending and upwardly displaced depression 29. The depression 29 is also located in radially adjacent but outward relationship to the outer perimeter 38 of the bottom plate 28. The diaphragm 26 is positioned within the depression 29. While the diaphragm and its associated pallet can be variously configured and or interrelated, it is presently preferred to provide an air cushion between the diaphragm 26 and adjacent porting of the pallet subassembly 47. The diaphragm 26 here has a flattened ring configuration and can be comprised of various materials. A presently preferred material is polytetrafluoroethylene.

Downwardly extending from the outer perimeter 39 of the top plate 27 is a circumferentially extending apron 31 that is suspended from the top plate 27 and that is preferably here comprised of sheet metal. The upper edge of the apron 31 is conveniently and continuously associated with the outer perimeter 39 of the top plate 27 by metal forming, welding or the like. The apron 31 extends preferably vertically and longitudinally relative to the neck 16 and preferably is located in radially uniformly spaced relationship between the neck 16 and the upstanding leg 23 of member 21. The volume of the region existing between the outer wall (here upstanding leg 23) and the apron 31 is at least equal to and preferably is greater than the volume in the region existing between the neck 16 and the apron 31. The radial distance between the neck 16 and the apron 31 is less than or equal to (but not greater than) the typical radial distance between the neck 16 and the upstanding leg 23. The apron 31 has a preferably uniform lower edge or terminus 33 that is located in upwardly and preferably uniformly spaced relationship to the inside upper surface of base leg 22 of member 21.

A hood plate 48 is optionally but preferably also provided for association with the pallet plate subassembly 47. The hood plate 48 is comprised of sheet metal and is circular, generally flattened and located generally in adjacent interfacial relationship with and over the top plate 27. The hood plate 48 has a center that preferably is coaxial with the centers of the top plate 27 and the bottom plate 28. The hood plate 48 has a diameter which is greater than the diameter of the top plate 27. The outer perimeter 49 of hood plate 48 is joined to an outer brim region 51 which is formed of sheet metal and which is flared outwardly and turned downwardly relative to the holding reservoir 24 for environmental shielding purposes. Conveniently, the brim region 51 is either formed from the hood plate 48 or mounted to the perimeter 49 by welding or the like.

To strengthen and stabilize the flattened cover-like structure comprised of pallet plate subassembly 47, hood plate 48 and diaphragm 26, a biasing web subassembly 34 is preferably provided which enhances maintenance of diaphragm 26 in a planar (or flattened) configuration as desired for uniform seating against the outer end 17. The diaphragm 26 is (as indicated above) normally in sealed engagement with the outer end 17 of neck 16. This seal may be regarded as the primary seal for the vent valve assembly 15. The biasing web subassembly 34 can have various configurations and structures, as those skilled in the art will appreciate. Here, illustratively, the biasing web subassembly 34 utilizes a pair of diametrically opposed formed rods 35A and 35B that are each comprised of steel and that are each preferably sized and configured so as to fit generally within the vent neck 16.

Each rod 35A and 35B includes both a circumferentially extending portion 36 that extends in radially spaced, adjacent relationship to the vent neck 16 and also a diametrically extending portion 37 that extends diametrically across most of the vent neck 16 about and preferably in adjacent relationship to the inner end 18. The circumferentially extending portion 36 has an upper end that is flared inwardly and that terminates in adjacent contacting relationship with portions of the pallet bottom plate 28 that are adjacent to the outer perimeter 38 of the bottom plate 28. The end of each portion 36 is preferably welded or otherwise mounted to adjacent portions of the bottom plate 28.

At their axially located cross-over location, the rods 35A and 35B are fastened together by welding or the like.

A machine bolt 42 axially extends upwardly through aligned channels in subassembly 47, hood plate 48 and diaphragm 26 and its outer end is threadably engaged with a retaining nut 43.

Figure 4:
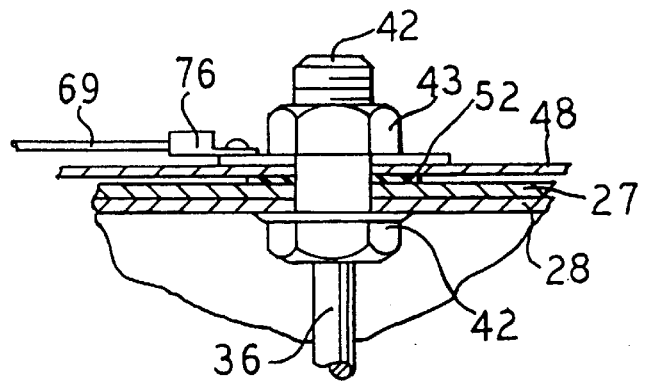
FIG. 4 is an enlarged fragmentary view of a portion of FIG. 1 in the central region of the pallet showing structural details.
Figure 5:
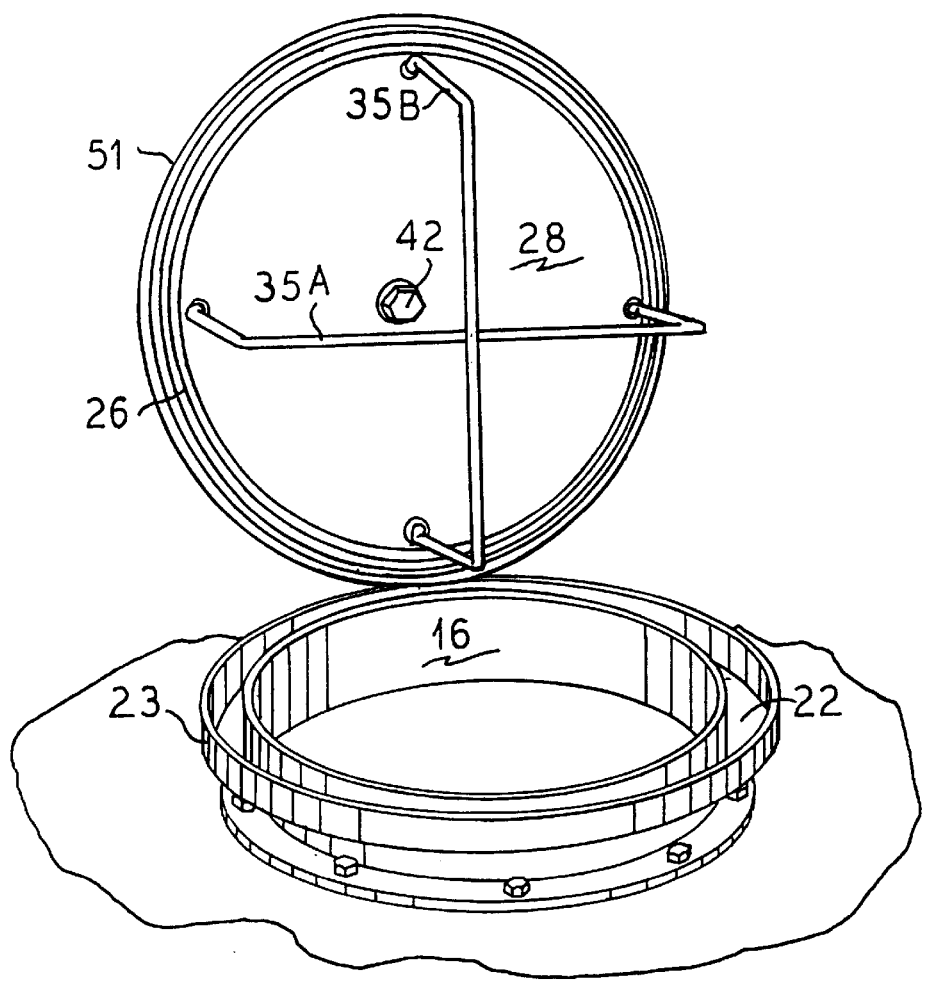
FIG. 5 is an partial exploded perspective view of the FIG. 1 valve structure with the subassembly of diaphragm, pallet and stabilizing web being raised at about 90° relative to the subassembly of flanged neck and reservoir.

A sealing washer 52 (as shown in FIG. 4) is positioned around the stem member of the bolt 42 between the top plate 27 and the hood plate 48. The washer 52 can be comprised of various materials. A presently preferred material is polytetrafluoroethylene.

Figure 3:
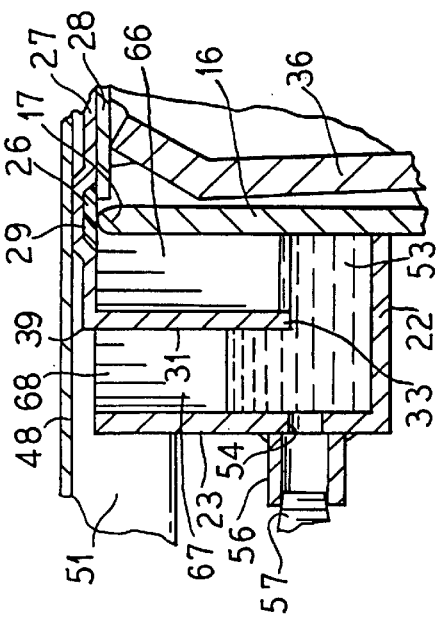
FIG. 3 is a fragmentary view similar to FIG. 2, but showing details of the liquid sealing valve when some leakage of vapor emissions from the tank interior past the diaphragm seat has occurred.
Figure 2:
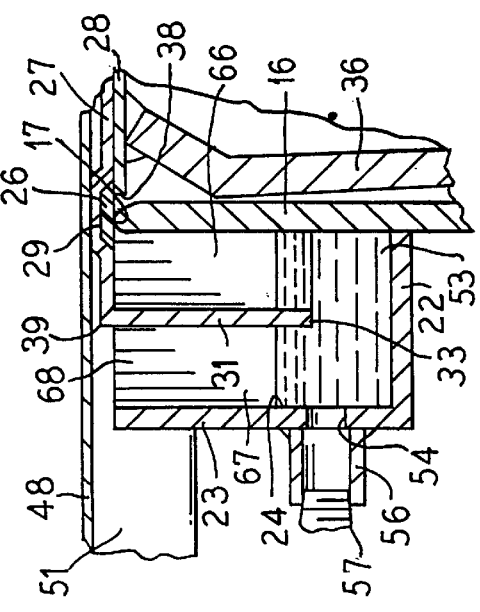
FIG. 2 is an enlarged fragmentary view of a portion of the FIG. 1 valve structure in the region of the liquid sealing valve showing details thereof when substantially no vapor leakage emissions from the tank interior past the diaphragm seat has occurred.

The holding reservoir 24, in operation of the vent valve assembly 15, is charged with a sealing liquid 53. Various liquids can be employed; preferably, the liquid 53 is an inert, relatively non-volatile oil which remains fluid over the entire range of environmental temperature and pressure variations wherein the vent valve assembly 15 is employed in any given installation. One suitable and presently preferred sealing liquid is a petroleum oil of preselected density (for purposes of achieving a desired set point). The fill level in the holding reservoir 24 of the liquid 53 is at least sufficient to immerse the lower edge 33 of the apron 31 therein (as illustrated in FIGS. 1–3, for example).

To achieve and maintain a desired fill level of liquid 53 in holding reservoir 24, a convenient auxiliary liquid supply arrangement can be employed. Here, for example, the upstanding leg 23 is provided with an aperture 54 and the aperture 54 is associated with an outwardly projecting connecting sleeve 56 that is butt welded to the leg 23. Sleeve 56 is threadably connected to one end of a nipple 57. The opposite end of nipple 57 is threadably connected to a sealing liquid supply vessel 58 that is here preferably equipped with a shut-off and flow regulating valve 59. Optionally, the vessel 58 and the valve 59 are adapted to maintain a predetermined sealing liquid 53 level in the holding reservoir 24. Supply vessel 58 and valve 59 are conventional structures known to the prior art.

For purposes of maintenance and shut down, the holding reservoir 24 is optionally provided with a drain pipe. Here, for example, leg 22 is joined to an elbow 61 by welding or the like. Elbow 61 optionally threadably joins a conventional sight glass assembly 62 and this subassembly in turn is connected to a drain cock 63. The sight glass assembly 62 permits an operator to detect the presence of water in the reservoir 24 when the particular reservoir liquid 53 has a greater density than water and is water immiscible.

In the tank 64, the set point (opening) pressure of the diaphragm 26 relative to outer end 17 of the vent valve assembly 15 is determined by the total weight exerted by the pallet plate sub-assembly 47, the apron 31, the hood plate 48 and associated components upon the diaphragm 26 in opposition to the pressure existing in the associated tank 64 and in neck 16. This weight in effect acts on the seal defined by the seating area existing between the diaphragm 26 and the outer end 17. Any small volume of fugitive vapor emissions from tank 64 leaking past this seal are directed into the closed chamber 66 existing above the level of the sealing liquid 53, the chamber 66 itself being defined by the combination of respective chamber 66 adjacent portions comprising the sealing liquid 53, the neck 16, the pallet plate subassembly 47, the diaphragm 26 and the apron 31. The liquid seal existing between the sealing liquid 53 and the lower edge portion 33 of apron 31 does not allow vapor emissions passing the seal between the diaphragm 26 and the outer end 17 to reach the atmosphere (see, for example, FIGS. 2 and 3). The level of the sealing liquid 53 in the closed chamber 66 is initially the same as the level of the sealing liquid in the outer chamber 67, but the normal volume of sealing liquid 53 in the closed chamber 66 is selected to be less than the normal open volume existing over the sealing liquid 53 in the outer chamber 67.

When and if the vapor pressure in the tank 64 increases, so that the amount of vapor emissions passing through the seal between diaphragm 26 and the outer end 17 increases, the pressure in the volume of vapor in the chamber 66 above the level of the sealing liquid 53 increases. The pressure increase resultingly displaces the liquid 53 downwards in chamber 66 and into the open, radially adjacent outer reservoir region or chamber 67 (see FIG. 3), but the liquid seal existing between the lower edge 33 of apron 31 and liquid 53 is still maintained.

The outer chamber 67 is defined in the reservoir 24 and is radially adjacent to the normally closed chamber 66. As in chamber 66, the open volume of the sealing liquid 53 in chamber 67 is defined by the level of sealing liquid 53 therein. Chamber 67 is additionally defined by the combination of adjacent wall portions of apron 31 and upstanding leg 23. An opening 68 exists at the top of outer chamber 67. The outer chamber 67 has a total volume that is preferably greater than the total volume of the chamber 66.

When and if the vapor pressure in the tank 64 and in the chamber 66 reaches a level where the sealing liquid 53 level in chamber 66 effectively becomes less than the lower edge 33 of apron 31, then the maximum liquid seal pressure of the vent valve assembly 15 is exceeded and the liquid seal is opened. In this condition, vapor in chamber 66 is vented to the atmosphere from chamber 66 through the chamber 67 and out through the opening 68.

The maximum liquid seal pressure provided by the liquid seal depends upon variables such as the density of the sealing liquid 53 and the effective height of the normally closed chamber 66. The sealing liquid employed can be selected so as to have a particular density so that in combination with the effective height or fill level, the set pressure can be preselected or determined by the type and fill level of sealing liquid 53 in the reservoir 24. Thus, the maximum liquid seal pressure for a particular sealing liquid 53 and a particular vent valve assembly can be rated.

In use, the reservoir 24 is filled with the liquid 53 to a level corresponding to a desired liquid seal valve pressure capacity rating. The pallet plate subassembly 47 is weighted so that the diaphragm 26 opens at a preset tank 64 vapor pressure. Here, such weight can be determined by the total weight of the assembly of the pallet and its associated components. Additional weights, if desired can be provided by circular steel plates 55 with open centers that are layered as shown in phantom in FIG. 1 on the top center portions of hood plate 48. These weights are selected so that, in combination with the weight of the cover assembly that is comprised mainly of hood plate 48, pallet plate subassembly 47 and biasing web subassembly 34, the diaphragm 26 separates from the outer and 17 at a predetermined or set pressure in the tank 64.

The opening pressure of the diaphragm 26 is preferably selected so as to be at or below the maximum liquid seal pressure although other opening pressures can be utilized if desired. For example, assume that the pallet plate subassembly 47 is weighted to provide a setting corresponding to 2 inches of water column and that the liquid seal between liquid 53 and apron 31 down to the lower edge 33 is set to provide a maximum liquid column equivalent to 4 inches water column. As the tank 64 pressure and the vapor leakage pressure in closed chamber 66 increase, the sealing liquid 53 in reservoir 24 is displaced (as described above), but the closed chamber 66 still contains any small volume vapor leakage from tank 64 past outer end 17 and diaphragm 26. When the tank pressure reaches the equivalent of 2 inches water column, then the weighted pallet plate subassembly 47 lifts the diaphragm 26, the liquid seal valve opens, and the desired pressure relief for the tank 64 is achieved. The vent valve assembly 15 is leak free until the pallet plate subassembly 47 lifts.

A wire or cable 69 is preferably provided with conventional connectors 76 and 77 at each of its opposite ends for interconnecting the neck 16 with the cover assembly including pallet plate subassembly 47 and its associated components. Thus, when this cover assembly is separated from the neck 16, it remains associated therewith by the wire or cable 69.

The valve assembly 15 is useful as a manhole when the valve assembly 15 is not associated with a pressurized (operating) tank 64. Although the valve assembly 15 is useful as a vent cover and provides emergency pressure venting or pressure release for storage tanks and the like, the assembly 15 incidentally provides convenient access for tank cleaning, inspection and repair work.

The valve assembly 15 is useful for tank installations where the possibility of extreme pressure rise or pressure surges might require emergency pressure release beyond the capacity of a normally operating vent. Under emergency conditions, the cover assembly raises fully to allow escape of vapors from the tank and prevent damage to the tank due to excessive pressure. The cover assembly is manually reset upon neck 16 after opening and disengagement from associated neck 16.

Referring to FIG. 6, another embodiment 71 of a pressure responsive vent valve structure of the present invention is shown. Vent valve structure 71 is adapted for use with a tank operating at superatmospheric pressures. The components of the vent valve structure 71 which correspond to components of the vent valve structure 15 are similarly numbered, but with the addition of prime marks thereto for identification purposes.

The vent valve structure 71 incorporates a neck 16' that is cooperatively associated by welding or the like at its inner end with a support flange 72. Flange 72 is illustratively connected with a tank connecting flange 73 by bolts 75.

The pallet plate 27' is here provided by a single sheet of circular metal. Adjacent to its periphery an upraised channel is provided which receives therein the diaphragm 26'. Diaphragm 26' is adapted to matingly seat over the outer end 17' of the neck 16' so that a seating interrelationship is achieved between the diaphragm 26' and the outer end 17'.

Upstanding from the support flange 72 at its outer perimeter is a sleeve 78 that is in radially outwardly spaced but in concentric relationship relative to the neck 16'. The base of each of the sleeve 78 is conveniently mounted to the flange 72 by a fastening means such as welding or the like. Thus, the reservoir 24' that is adapted for holding sealing liquid 53' is defined by the neck 16', the flange 72 and the sleeve 78.

Slidably engaged over outside of the sleeve 78 and upstanding therefrom is a cylindrical screen 79 which is conveniently and preferably comprised of a durable and non-oxidizing material, such as stainless steel or the like. The cylindrical screen 79 is retained in engaged relationship to the sleeve 78 by means of machine screws 81 extending through portions of the screen 79 into threadably engaged relationship with the radially adjacent sleeve 78.

Threadably engaged with the upper face of the flange 72, and in effect located at the bottom of the reservoir 24 are a plurality of upstanding posts 82 (here preferably four) that are preferably equally circumferentially spaced and are preferably each comprised of a steel rod or the like. Over the threaded top ends of each of the posts 82, a cross-sectionally circular hood 83 is supported. The hood 83 has a central flat plate area and a peripheral, diagonally outwardly extending downturned skirt. The hood 83 is received over the upper end of the screen 79 and is held in place over the respective upper ends of the posts 82 by wing nuts 84 that are threadably engaged therewith.

Upstanding axially from the pallet 27' is a centering and guidance rod 86. The lower end of the rod 86 is retained in engagement with the outer face of the pallet 27' by means of a machine bolt 87 which extends through the pallet 27' at its center and is threadably engaged with a threaded axial socket in the lower end of rod 86.

An aperture is formed, in the center of the top plate of the hood 83. In this aperture, a tube 88 is axially positioned and upstands. Tube 88 is fixed to the hood 83 by means of a disc-shaped side flange 89 that is connected by welding or the like to the tube 88. The side flange 89 is held against the hood 83 top plate by a plurality of rivets 91. The upper end of tube 88 is closed by a closure cap 90. The upper end portion of the rod 86 is received in the bottom end portion of the tube 88.

The dimensional interrelationship between circumferential side portions of the posts 82 and outer adjacent portions of the apron 31' is such that the apron 31' is slidably movable along the posts 82. During such sliding movements, the position and orientation of the pallet 27' is maintained by the centering action of the rod 86 slidably moving within the tube 88. Consequently, when the diaphragm 26' and pallet 27' are uplifted by pressure within the tank, the pallet 27' moves upwardly and axially, the extent of the movement being influenced by the pressure differential between the environmental or atmospheric pressure and the interior tank pressure. The set or opening pressure for the diaphragm 26' relative to the upper end 17' is illustratively set by the pallet 27' and a weight resting against the outside face of the pallet 27'. Here, this weight is illustrated by the circular and centrally apertured steel plate 92 that disposed on the top of the pallet 27'.

With the diaphragm 26' being normally seated upon the outer end 17', fugitive vapor emissions from inside the tank that pass through this seat area between the diaphragm 26' and the outer end 17' enter the closed chamber 66'. The operation of the liquid valve structure here is as described above in relation to the vent valve assembly 15.

To achieve and maintain a desired level of sealing liquid 53 in the reservoir 24', a supply vessel 58' and an associated valve 59 are employed as above described in relation to the vent valve 15.

The configuration of the vent valve assembly 71 in the valve open configuration where the platen 27' and the apron 31' are in their open and raised configuration is illustrated by FIG. 6A.

The vent valve assemblies 15 and 71 achieve their respective opening or set point pressures for the pallet and diaphragm subassembly through regulated weight, such as the optional use of weights loaded onto the upper outside surface of the pallet. However, those skilled in the art will readily appreciate that other means can be used for regulating the opening or set pressure. For example, an embodiment 95 of a vent valve structure of the invention is shown in the FIG. 7 which employs a spring compression loading subassembly for the pallet.

In the valve structure 95, a vent neck 96 is incorporated which is conventionally cylindrical in configuration and which has an outer end 97 and an inner end 98. The inner end 98 is provided with a flange 99 by welding or the like, and the flange 99 is mounted to a tank connecting flange 101 by bolts 102 in a manner similar to that employed for the valve structure 71. Those skilled in the art will appreciate that various tank connection means can be employed.

Figure 7:
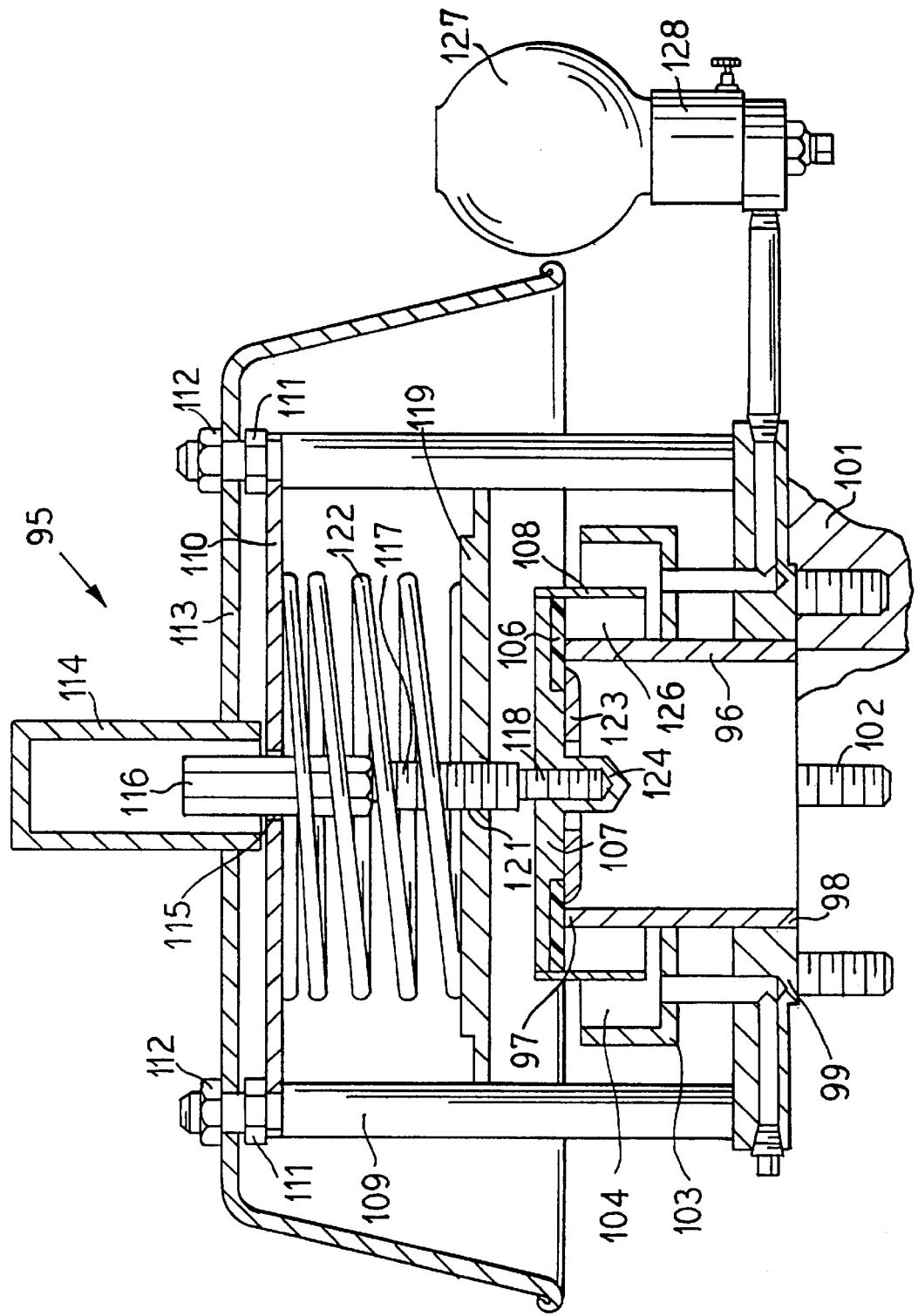
FIG. 7 is a view similar to FIG. 1, but shows a third embodiment of a pressure responsive vent valve structure of this invention.

The neck 96 is associated with an outer circumferentially extending L-configured member 103 which is similar in structure and function to the L-configured member 21 in the valve assembly 15. Thus, L-configured member 103 and the vent neck 96 cooperate to define a sealing liquid holding reservoir 104 that circumferentially extends around the outside of the neck 96 in longitudinally preferably uniformly spaced but adjacent relation to the outer end 17. The vent valve structure 95 includes a circumferentially continuously extending flattened disk-configured diaphragm 106 that is releasably seated over the outer end 97 when the valve structure 95 is in its normal diaphragm 106 closed position (as shown in FIG. 7). To support the diaphragm 106, a pallet plate 107 is associated therewith. Pallet plate 107 extends across the outside face of the diaphragm 106 and also across the outer end 17. Plate 107 has a larger diameter than neck 96. Thus, the pallet plate 107 and the diaphragm 106 cooperate to provide closure for the outer end 97 of the neck 96.

The radially outer perimeter of the pallet plate 107 is provided with a circumferentially extending downturned apron 108. The apron 108 is preferably comprised of sheet metal, is preferably concentric with the neck 96, and is conveniently mounted to the pallet plate 107 by welding or the like. Like the apron 31 in the valve assembly 15, the apron 108 preferably extends vertically and longitudinally relative to the neck 96 and extends downwardly into the reservoir 24'. The spacing relationships between the apron 108, and the neck 96, and the member 103 are as described above in relation to the apron 31 of the valve structure.

Upstanding from and threadably connected with the upper and radially outer surface of the flange 99 are a plurality of upstanding posts 109 (here preferably four) that are preferably equally circumferentially spaced. The upper end portion of each post 109 is threaded. A base plate 110 that is generally circular (in outside perimeter) has respective apertures defined therethrough that are individually alignable with such upper ends and are extended over such upper ends. The base plate 110 is held to each post 109 upper end by a threadably associated retaining nut 111.

Conveniently mounted over the upper post ends 109 and over the nuts 111 is a hood 113 which is conveniently itself held upon the upper end of each post 109 by a threadably engaged retaining nut 112.

At and through the center of the hood 113 is mounted (by welding or the like) a metal tube 114 that is end capped. The hood 113 as is conventional opens downwardly so that, when the valve 95 opens, the escaping gaseous or vaporous material is moved downwardly and outwardly.

The plate 110 at its center is provided with a polygonally sided aperture 115 (preferably an equal sided hexagon). An elongated stem 116 which at its upper end region is correspondingly polygonally sided is slidably extended upwardly through the aperture 115 so that such upper end region protrudes with the interior of the tube 114. The side relationship between the upper end of stem 116 and the aperture 115 is such that the stem 116 is restrained from rotational movements. The stem 116 includes two longitudinally adjacent threaded lower sections, one being a middle section 117, the other being a lower section 118. Section 117 is larger in diameter than the terminal lower threaded section 118. A peripherally circular tensioning plate 119 is provided which has a central threaded bore 121 extending perpendicularly therethrough. Bore 121 is engaged with the threaded middle section 117 of stem 116. Circumferentially mounted around the stem 116 and longitudinally extending between the base plate 110 and the tensioning plate 119 is a coiled tensioning spring 122. The adjustable position of the tensioning plate 119 along the stem 116 sets the downward compression load being axially exerted by the tensioning spring 122 upon the pallet plate 107 as those skilled in the art will appreciate. The outer perimeter of the tensioning plate 119 is sized so as to permit the tensioning plate 119 to move slidably over adjacent surface portions of the individual posts 109. Resting interfacially against the bottom surface of the pallet plate 107 is a preferably circular retainer plate 123. The center of the retainer plate 123 is provided with a bore that is associated with a capped nut 124. Lower section 118 extends through the pallet plate 107 and is threadably joined to the capped nut 124. The capped nut 124 and the retainer plate 123 thus separate the spring subassembly from the interior of the associated tank.

The tensioning plate 119 is rotatably and threadably moved along the middle section 117 until a desired compression load is achieved for the tensioning spring 122. This compression load for the pallet plate 107 is achieved, thereby to hold the assembly of the pallet plate 107, the diaphragm 106, the retainer plate 123 and capped nut 124 against the end of 97 of the neck 96 until the pressure inside the tank reaches a set level.

At that point, the pallet plate 107 and diaphragm 106 separate from their seat against the outer end 97, and, along with the stem 116 and the tensioning plate 119 are moved upwards, thereby opening the vent valve structure 95. When the pressure above the set point is released, the spring tension associated with the spring 122 causes the pallet plate 107 and diaphragm 106 along with the indicated interconnected components to descend so that the diaphragm 106 reseats against the outer end 97.

In the liquid sealing valve, the normally closed chamber 126 is comparable to the normally closed chamber 66 in the valve structure 15 and the operation of the liquid sealing valve here is comparable to that in the valve structure 15. The manner in which the chamber 126 receives and holds fugitive vapor emissions from the inside of the tank which pass the outer end 97 and the diaphragm 106 is the same as has been previously described in connection with the vent valve structures 15 and 71.

The manner in which the reservoir 104 is supplied with a sealing liquid is here illustratively accomplished through the use of a supply vessel 127 and an associated valve 128 which are comparable to the vessel 58 and valve 59 in valve assembly 15.

Figure 8:
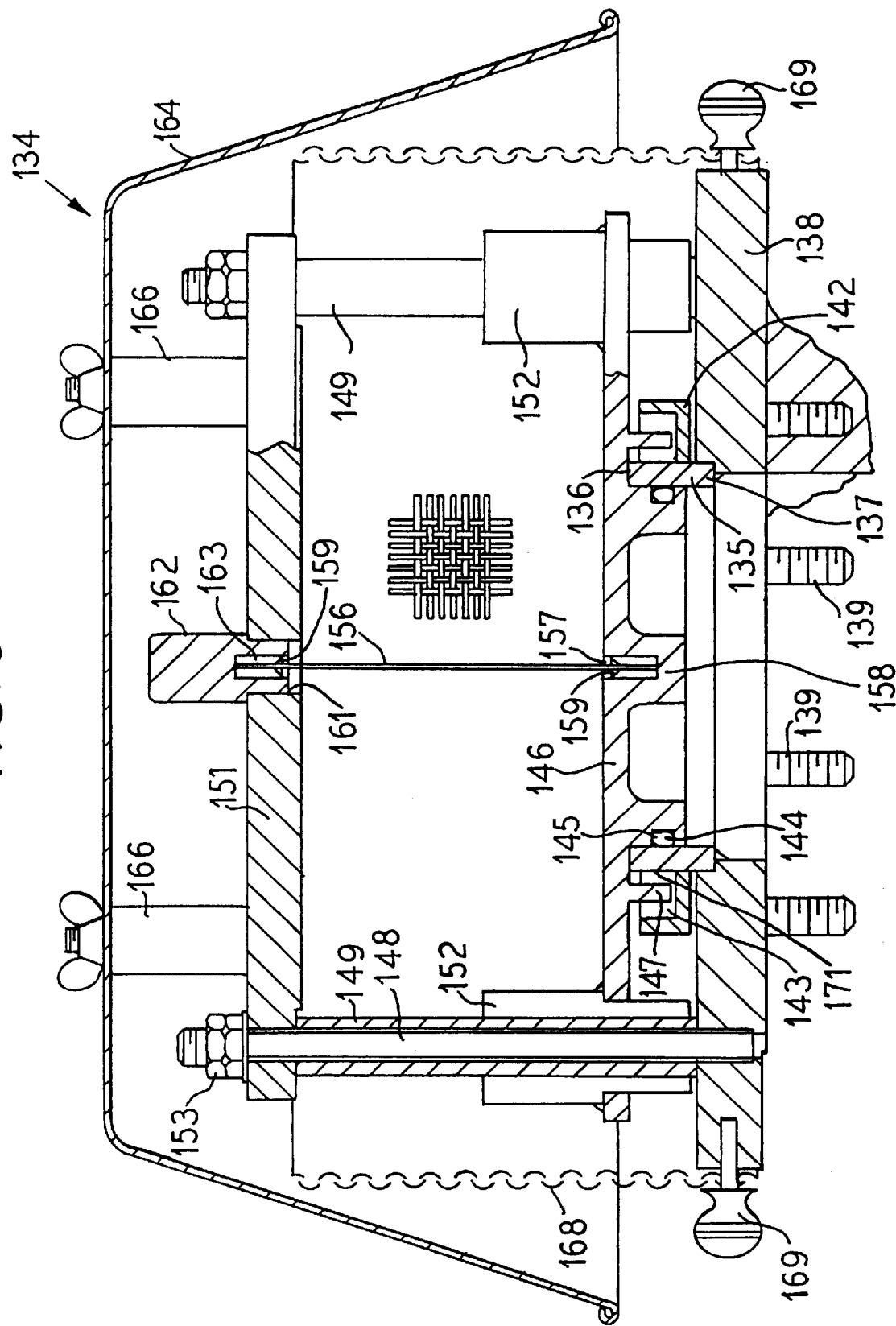
FIG. 8 is a view similar to FIG. 1, but shows a fourth embodiment of a pressure responsive vent valve structure of this invention.
Figure 9:
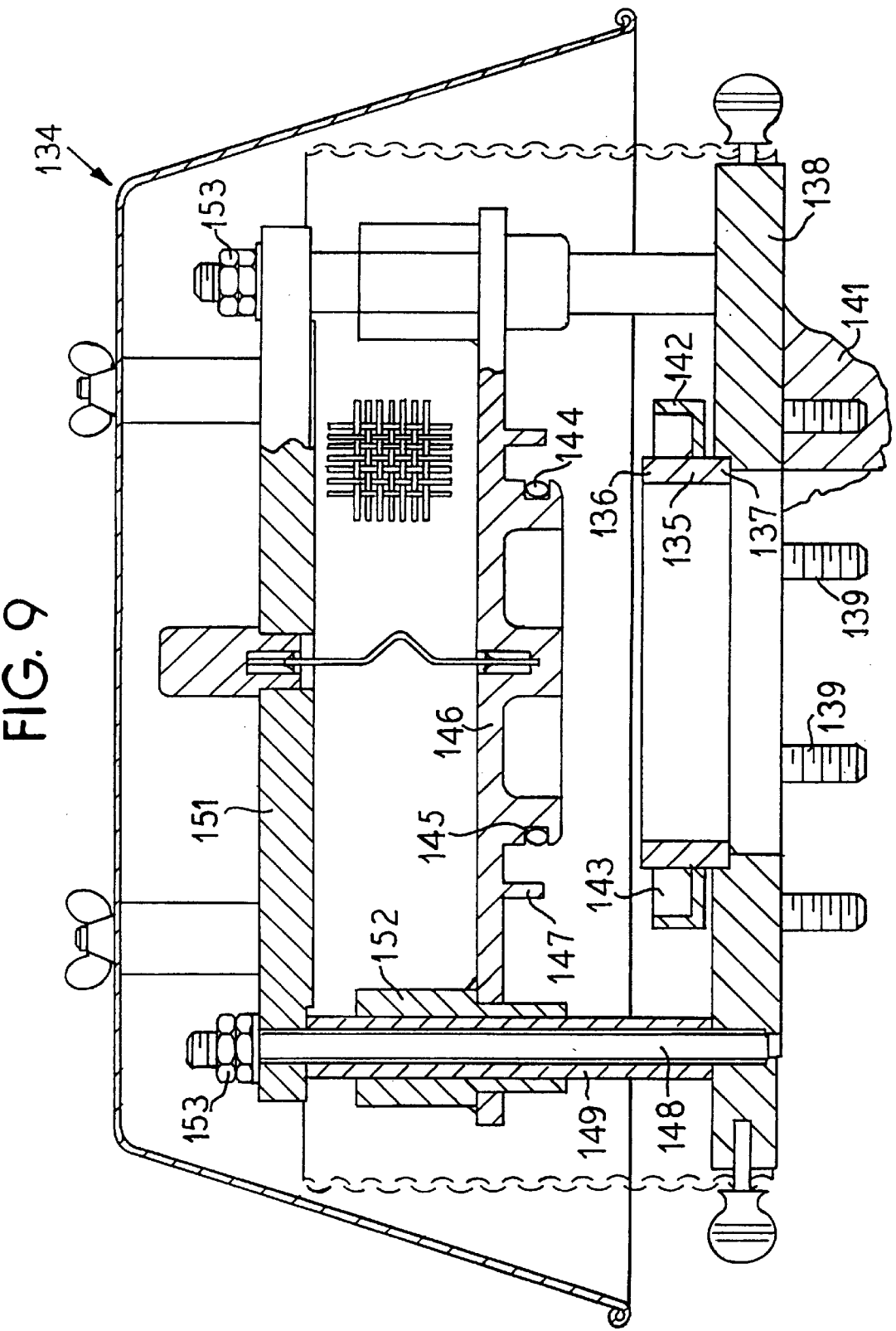
FIG. 9 is a view similar to FIG. 8, but shows this valve embodiment in its open configuration.

Another means for achieving a set point valve opening pressure in a valve assembly of the invention is illustrated by the vent valve assembly 134 shown in FIGS. 8 and 9.

The vent valve assembly 134 incorporates a neck 135 which is conventionally cylindrical in configuration and which has an outer end 136 and an inner end 137. The neck 135 is preferably comprised of steel or other metal alloy. The inner end 137 is provided with a mounting flange 138. Circumferentially spaced bolts 139 extend longitudinally through the flange 138 and interconnect the flange 138 with a mounting flange 141 of a tank or the like. Other mounting arrangements can be employed.

In an analogous manner to neck 16 in the valve assembly 15, the vent neck 135 is here provided with an outer, circumferential extending L-configured member 142 whose base leg portion is connected abuttingly preferably by welding to circumferential outside surface portions of the neck 135. The L-configured member 142 and the neck 135 cooperate to define a sealing liquid holding reservoir 143 that circumferentially extends around the outside of the neck 135 longitudinally and that preferably is in uniformly spaced adjacent relationship to the outer end 137. The component size relationships remain as described above in relation to the valve assembly 15. Those skilled in the art will readily appreciate that the member 142 can have various configurations and that the reservoir 143 can be defined by various means.

The vent valve assembly 134 includes a circumferentially continuously extending diaphragm 144 which here is preferably in the form of an O-ring. The O-ring diaphragm 144 is lodged in a groove 145 that circumferentially extends around the inwardly projecting, longitudinally extending portion of a pallet support structure 146 that is here formed by casting and/or machining of a metal such as steel or aluminum alloy. The inwardly projecting, longitudinally extending portion is cross-sectionally circular and the groove 145 is located adjacent to the terminal inner end of this portion. This portion of the pallet member 146 is sized and adapted to slidably engage and move into and out of association with the inside surface portions of the neck 135 adjacent to outer end 136. When the pallet member 146 is thus engaged with the neck 135, the O-ring 144 is sealingly locally engaged with inner circumferential sidewall portions of the neck 135. The adjacent upper outer end portions of the pallet member 146 extend diametrically across the outer end 136 of the neck 135 and effectively close the outer end 136.

The pallet member 146 includes radially outwardly extending upper outer end portions which extend radially well beyond the neck of 135. Adjacent to the neck 135, the outer and radially outwardly extending portions of the pallet member 146 are provided with a downwardly depending, circumferentially extending apron 147 which preferably perpendicularly extends relative to the connecting portions of the pallet member 146. Apron 147 is arranged to be positioned within the reservoir 143 when the pallet member 146 is fully engaged with the neck 135. The lower end of the apron 147 terminates in upwardly spaced relationship to the bottom of the reservoir 153. The apron 147 relative to the reservoir 143 is radially offset so as to be disposed in closer relationship to the outside wall of the neck 135 than it is to the inside radially adjacent wall portions of the L-configured member 142. The relationship between components in the liquid valve subassembly is as described above in relation to the valve assembly 15.

The mounting flange 138 has a plurality (preferably four) of equally circumferentially spaced posts 148 mounted to the upper surface thereof in threaded association or the like. Each post 148 is circumferentially associated with a slidably engaged sleeve 149. The length of each sleeve 149 is chosen so as to permit a platform plate 151 to be mounted over the upper ends of the respective posts 148 and then to be in spaced, parallel relationship to the flange 138. The opposite ends of the spacer sleeve 149 are thus abuttingly engaged, respectively, with adjacent surface portions of the mounting flange 138 and the platform plate 151. In the assembled valve assembly 134, the respective threaded projecting upper ends of the posts 148 are each conveniently engaged with a lock nut 153 or the like as desired.

A slide 152 circumferentially extends over each spacer sleeve 149. The lower outside circumferential region of each slide 152 is reduced in diameter relative to the upper portion thereof. The pallet member 146 is provided with outer extension portions, and each of these extension portions is provided with a channel 154 therethrough. Each channel 154 is adapted to have the lower end of each slide 152 slidably extend therethrough. The upper surface of the pallet member 146 adjacent each channel 154 abuts against an adjacent larger upper portion of slide 152. The adjacent portions of the pallet member 146 are fastened to each slide 152 preferably by welding. Thus, the pallet member 146 is adapted to slidably move axially relative to the neck 135 with its movements being guided and limited by the movement of the slides 152 along the respective spacer sleeve 149.

To regulate the set point valve opening pressure for the pallet 146 and the diaphragm 144, a buckling pin 156 is provided. The buckling pin 156 is positioned so as to extend longitudinally along the axis of the neck 135. To achieve such a positioning, the central or axial region 158 of the pallet member 146 is conveniently thickened downwardly to an extent comparable to that employed for the circumferential portion thereof that extends down into the neck 135. A perpendicular channel or axial bore 157 is provided in the upper face of the thickened portion 158. One end of the buckling pin 156 is associated with a pin centering eyelet 159 and the eyelet 159 with associated pin 156 is positioned in the bore 157.

A threaded channel 161 is provided about the axis of the platform plate 151. Associated with the channel 161 is a terminally threaded plug 162. The lower (threaded) end of the plug 162 is axially provided with a channel 163.

The opposite (upper) end of the buckling pin 156 is, like the other (lower) end, associated with a pin centering eyelet 159 which is then positioned in the channel 163. Tightening of the plug 162 in the channel 161 proceeds until the buckling pin 156 relatively rigidly extends between the plate 151 and the pallet 146. In this configuration, the interrelationship between components is such that the lower end of each slide 152 is adjacent to the surface of the flange 138.

When the pressure in the associated tank reaches the level corresponding to the set point for buckling pin 156 failure, the buckling pin 156 buckles along its length and assumes a bent configuration such as is, for example, illustratively shown in the valve assembly 134 open configuration shown in FIG. 9. As the buckling pin 156 buckles, the pallet member 146 and the diaphragm 144 slidably move axially upwardly away from engagement with the neck 135 and towards the platform plate 151. The upward movement of the pallet member 146 is limited by abutting engagement of the upper ends of the slides 152 with under surface portions of the platform plate 151.

For safety purposes, the valve assembly 134 is provided with a hood 164 which can be variously configured. Here, hood 164 illustratively has a central circular flat top area and peripheral, downwardly and diagonally extending skirt portions. To support the hood 164, the platform plate 151 is here provided with four short posts 166 that are circumferentially in equally spaced relationship to one another and that are preferably inwardly spaced in relation to the posts 148. The top of each post 166 is threaded and conveniently terminally provided with a wing nut 167. The hood 164 can rest upon the posts 166, yet is easily removed for servicing and routine maintenance. The bottom of each post 166 is conveniently threadably engaged with threaded bores formed in the platform plate 151.

Additional shielding is provided by positioning a cylindrical screen 168 about the outer perimeter of the flange 138. The screen 168 is retained in association with the flange 138 by means of a plurality of winged pins 169. To supply the reservoir 143 with a sealing liquid (not detailed), the vent valve assembly 134 is conveniently provided with a supply vessel and valve arrangement (not shown), but which can be, for example, as illustrated for the valve assembly 15.

Any fugitive vaporous emissions which escape past the seal provided by neck 135 and diaphragm O-ring 144 from the interior of the associated tank pass into the normally closed chamber 171 existing between the outside wall of the neck 135 and the adjacent portions of apron 147. The operation and functioning of the liquid seal assembly corresponds to the operation described above in relation to the vent valve assembly 15.

Figure 10:
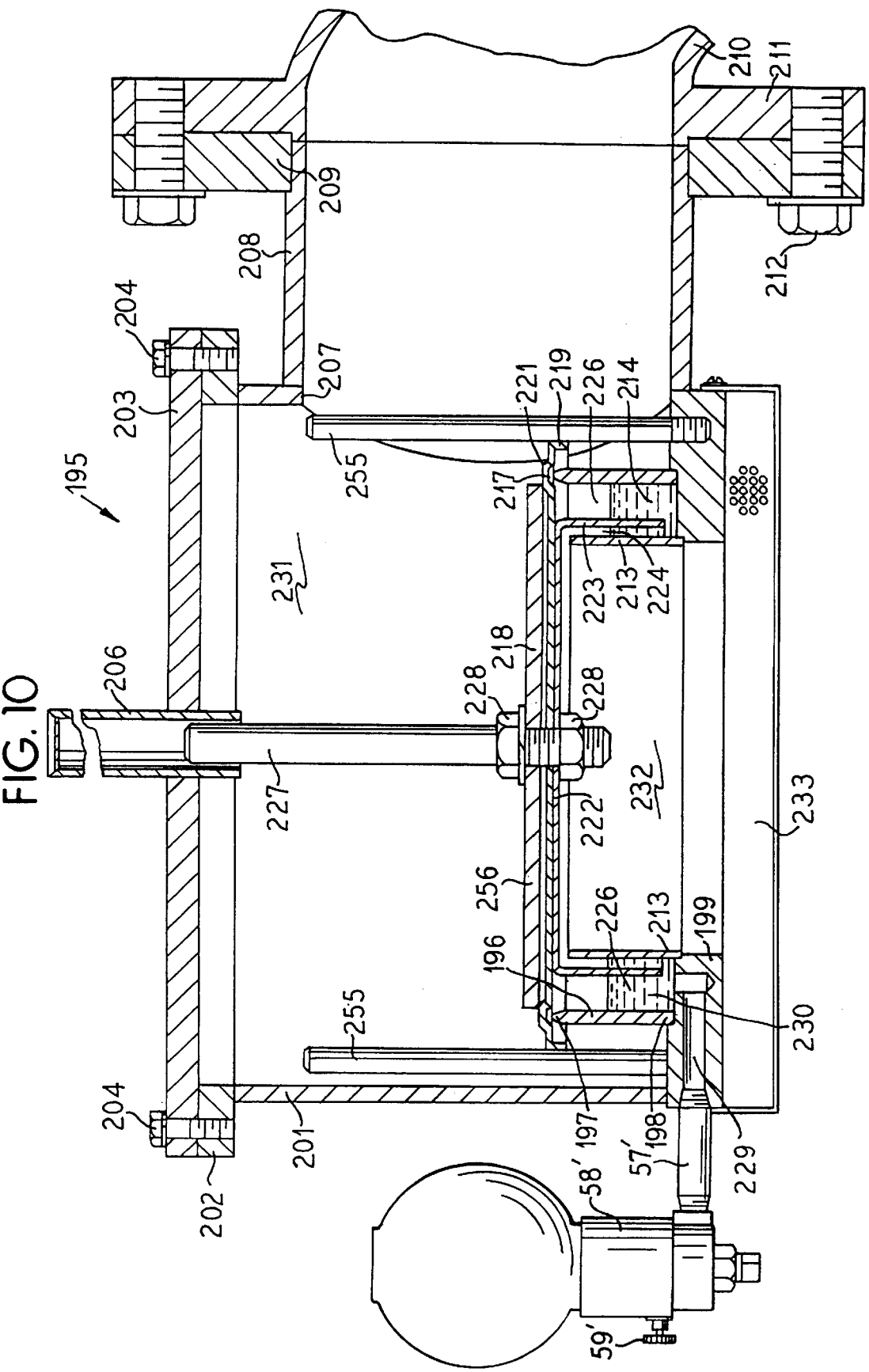
FIG. 10 is an axial and diametrical cross-sectional view taken through one embodiment of a subatmospheric pressure responsive vent valve structure of this invention, this valve structure being shown in connected association with a (fragmentarily shown) tank that is being operated at subatmospheric pressure.
Figure 11:
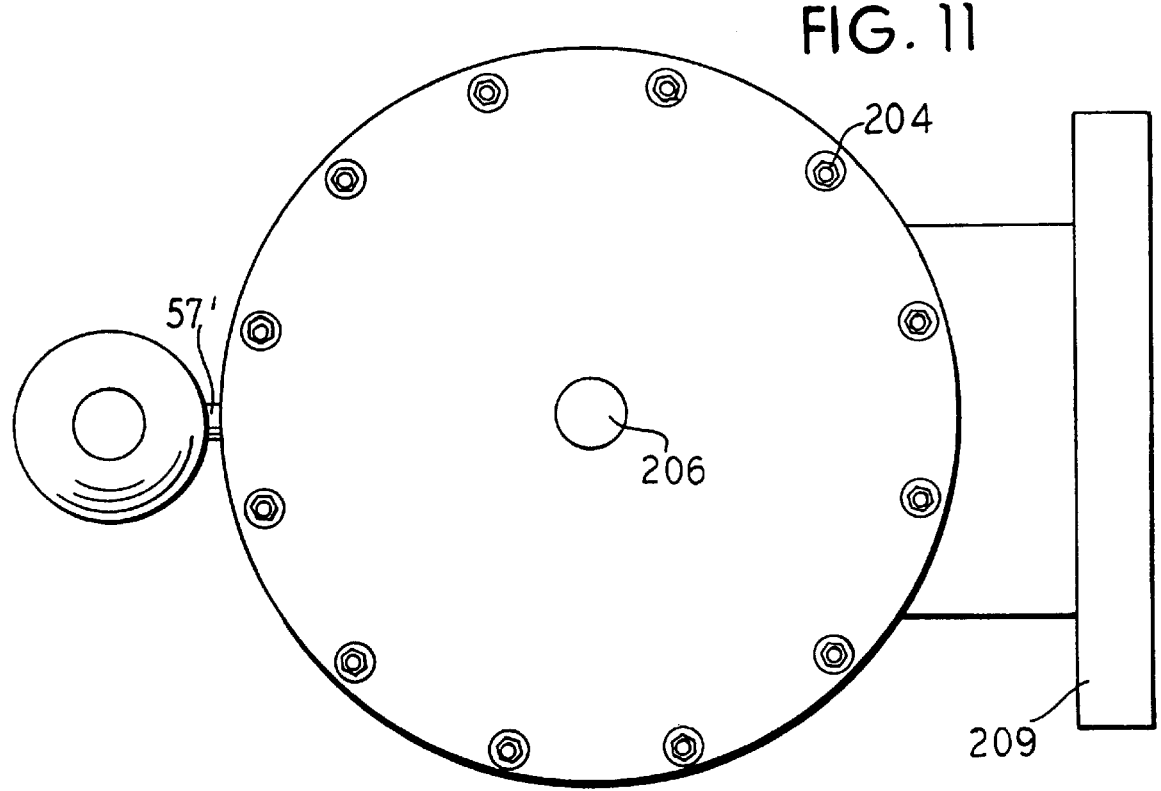
FIG. 11 is a top plan view of the valve embodiment shown in FIG. 10.
Figure 12:
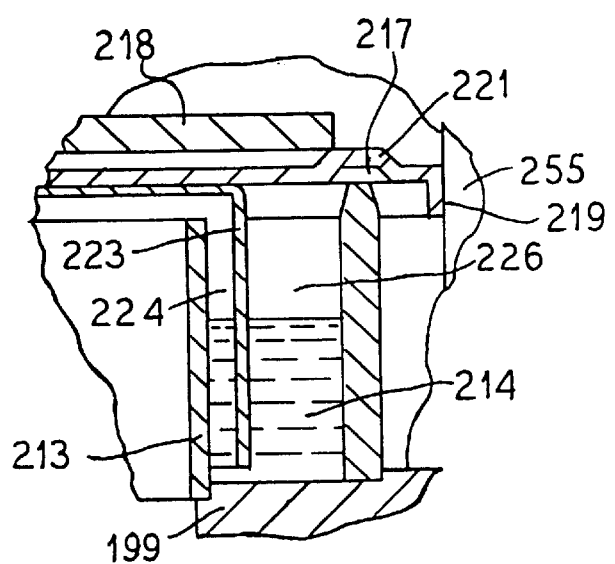
FIG. 12 is an enlarged fragmentary view of a portion of the FIG. 12 valve structure taken in the region of the liquid sealing valve showing details thereof.

Referring to FIGS. 10–12, there is in an embodiment 195 of a vent valve structure of the invention that is adapted for use with a tank operating at subatmospheric pressures.

The vent valve structure 195 incorporates a vent neck 196 which has a conventionally cylindrical configuration and which has an outer end 197 and an inner end 198 and which is preferably comprised of steel or other metal alloy. The outer end 197 is typically machined so as to provide a uniform circumferentially extending seating surface. The inner end 198 is abuttingly mounted by welding or the like to the upper mid region of a circumferentially extending mounting flange 199.

The upper outside perimeter adjacent face of the flange 199 has upstanding therefrom a cylindrical casing 201 which is connected with the flange 199 by welding or the like. The upper end of the casing 201 is associated by welding or the like with an outturned flange 202. A cap plate 203 is set upon the casing flange 202 and is connected thereto by a plurality of circumferentially spaced machine bolts 204. Through an axially extending channel defined in the cap plate 203 a tube 206 is extended and upstands. The tube 206 is associated with the cap plate 203 by welding or the like. The tube 206 is provided with a cap at its upper end.

A circular hole in the circumferential sidewall of casing 201 is matingly associated with a connector casing 208 by welding or the like. The outside end of connector casing 208 is associated with a mounting flange 209 by welding or the like. In turn, an elbow casing 210 (shown fragmentarily) is provided which has a welded connector flange 211 is abuttingly joined to the flange 209 and is joined thereto by means of circumferentially spaced machine bolts 212. The elbow casing 210 in turn is joined conventionally to a tank nozzle (not shown) or the like.

The inner circular perimeter of the flange 199 is connected to an upstanding sleeve 213 by welding or the like. The sleeve 213, the flange 199, and the neck 196 together define a reservoir chamber 214. Those skilled in the art will appreciate that a reservoir chamber 214 can be defined by various alternative means.

The vent valve structure 195 includes a circumferentially and continuously extending flattened, ring-configured diaphragm 217 which is configured and sized so as to be releasably seatable over the outer or upper end 197 of the neck 196.

A pallet plate 218 is provided that is conveniently comprised of sheet metal and that is associated with and supports the diaphragm 217. Preferably and as shown, the pallet plate 218 here has a generally circular broad, flattened central region with a downturned outer peripheral flange 219 that acts as an protective hood for the seat region between the diaphragm 217 the upper end 197 and that also acts as a slide relative to posts 224 as described below. In inwardly and radially spaced but adjacent relationship to the outer perimeter of the pallet plate 218 there is defined on the bottom surface of the pallet plate 218 a circumferentially extending upwardly displaced depression 221. The diaphragm 217 is positioned in and across the depression 221. The preferred present material for the diaphragm 217 is polytetrafluoroethylene.

The pallet plate 218 is here associated with a generally circular bottom plate 222. Bottom plate 222 and the pallet plate 218 are in adjacent interfacial relationship with one another and have coaxial respective centers. The bottom plate extends over and across the sleeve 218 upper end, but the upper end of the sleeve 213 is in longitudinally spaced, adjacent relationship to the bottom plate 222. The pellet plate 218 has a substantially larger diameter than the bottom plate 222. Downwardly extending from the outer perimeter of the bottom plate 222 is a circumferentially extending apron 223 that is suspended from bottom plate 222 and that is preferably, like the bottom plate 222, comprised of a sheet metal, such as steel or stainless steel. The upper edge of the apron 223 is conveniently and continuously associated with the outer perimeter with the bottom plate 222 by welding or the like. The apron 223 extends preferably vertically and longitudinally relative to the neck 196, and preferably the apron 223 is located in radially uniformly spaced relationship between the neck 196 and the sleeve 213.

The volume of the chamber 224 that is defined between the apron 223 and the sleeve 213 is preferably smaller than, and is not greater than, the volume of the chamber 214 that is defined between the apron 223 and the neck 196. The radial distance between the neck 196 and the apron 223 is preferably always greater than or equal to (but is not less than) the radial distance between the apron 223 and the sleeve 213. The apron 223 preferably has a uniform lower end or terminus that is in upwardly and preferably uniformly spaced relationship to the adjacent upper surface of the flange 199.

A plurality of upstanding guideposts 224 (here illustratively four) are provided in circumferentially spaced relationship relative to one another about and adjacent to the pallet plate 218. Each post 224 is conveniently threaded at its lower end and engaged with a mating channel provided in flange 199.

Axially extending through and upwardly from the pallet plate 218 and the bottom plate 222 is a retaining and centering rod 227. The lower end of centering rod 227 is held by clamping nuts 228 (paired); these nuts can also hold an optional pallet weight plate 256. If present, the plate 256 has a central channel that is slidably engagable with the centering rod 227. The upper end portion of rod slidably extends into the tube 206.

To supply a sealing liquid 230 to the reservoir 214 a supply system similar to that employed in valve 15 is here used involving nipple 57', vessel 58' and regulating valve 59' (the corresponding parts being designated by prime marks for present identification purposes). The nipple 57' joins and feeds a channel 229 in flange 197.

A screen 233 is associated with lower outer perimeter regions of the flange 199 by machine screws or the like (not shown). Atmospheric air passes through screen 233 into the space 232 existing within sleeve 213.

The set point pressure at which the diaphragm 217 unseats from upper end 197 is determined by the weight upon the diaphragm 217. This weight is comprised of the sum of the weights of the pallet plate 218, the centering rod 227, the apron 223, plus the weight of any (optional) weight plate 256 that rests upon the upper surface of the pallet plate 218.

The set point pressure in an associated tank at which the diaphragm 217 unseats from the upper end 197 is reached when the atmospheric air pressure existing in space 220 becomes great enough relative to tank pressure and pressure in space 231. Thus, when a drop (or decrease) in the subatmospheric pressure that exists in the space 231 falls below a predetermined (usually chosen as a safe) tank operating subatmospheric (vacuum) pressure level, then the set point is such that atmospheric pressure becomes relatively great enough to unseat the diaphragm 217 and lift the combination comprising pallet plate 218, diaphragm 217, bottom plate 218, apron 223, and centering rod 227 plus the (optional) weight plate 256 (if present) away from the upper end 197. The extent of upward movement of this combination depends upon the amount of the pressure differential that exists between atmospheric pressure and tank subatmospheric pressure. Upward movement of this combination causes the centering rod 227 to move upward in the tube 206 while portions of the flange 219 that are adjacent to the respective guide posts 224 slidably move therealong. When the tank emergency subatmospheric pressure is relieved, the weight of this combination allows it to descend whereupon the diaphragm 217 reseats at the upper end 197.

When the valve structure 195 is in its normally closed position as shown in FIG. 10, owing to the connection of the valve structure 195 to a tank (above described) which is operating at subatmospheric pressure, the space 231 located over the pallet 218 and around exterior portions of the neck 196 inside of casing 201 and below plate 203 is maintained at the real time tank operating subatmospheric pressures. Concurrently, as indicated above, the space 232 beneath the pallet 218 and around the interior of the sleeve 213 is maintained at atmospheric pressures since this space 232 is open to the environment through the screen 233. The reservoir chamber 224 and the reservoir chamber 226 each have a floor or bottom that is initially the same and that is defined by the level of the volume of the sealing liquid 230 that has been charged thereinto from the liquid holder 58'. These liquid levels in each chamber 224 and 226 correspond to the selected normal or average subatmospheric pressure associated with the associated operating tank. Under normal or average tank operating subatmospheric pressure, which can be considered to be the initial situation, the pressure in each of the chambers 224 and 226 above the sealing liquid 230 corresponds to atmospheric pressure.

The interior of chamber 224 is interconnected with the space 232 but the interior of chamber 226 is isolated from the interior of chamber 224 and is in effect closed. However, slight leakage of tank vapors usually occurs across the seat between diaphragm 217 and end 197.

If and when the pressure in space 231 increases (reflecting a rise in the normal subatmospheric operating pressure of the tank), the liquid level in the chamber 224 is increased because the level of the liquid 230 in chamber 226 falls. During this liquid level rise in chamber 224, the liquid seal existing between the apron 223 and the liquid 230 is maintained as desired.

If and when the pressure in space 231 is reduced, then the liquid level in chamber 226 rises and the liquid level in chamber 224 falls. If the pressure reduction in space 231 and in chamber 226 becomes sufficient to cause the relative pressure of atmospheric air in chamber 224 to move the liquid 230 level down to the bottom of the apron 223, then the seal between apron 223 and liquid 230 is broken, resulting in an inward flow of atmospheric air through the now open chamber 224 into chamber 226. Either before or at this maximum liquid seal pressure, that is, the pressure before the liquid seal between apron 223 and liquid 230 is broken, it is now usual and greatly preferred to have the set point pressure be reached for unseating of the diaphragm 217 from the upper end 197. When this set point pressure is reached, the apron 223 is effectively separated from the liquid 230 in the reservoir 214. During the operation of the tank, any fugitive vapors which pass the seal between the diaphragm 217 and the upper end 197 are retained in the chamber 226 and do not escape into the environment (or atmosphere) so long as the liquid seal relation to apron 223 remains intact. Other set point pressures can be used if desired.

Figure 13:
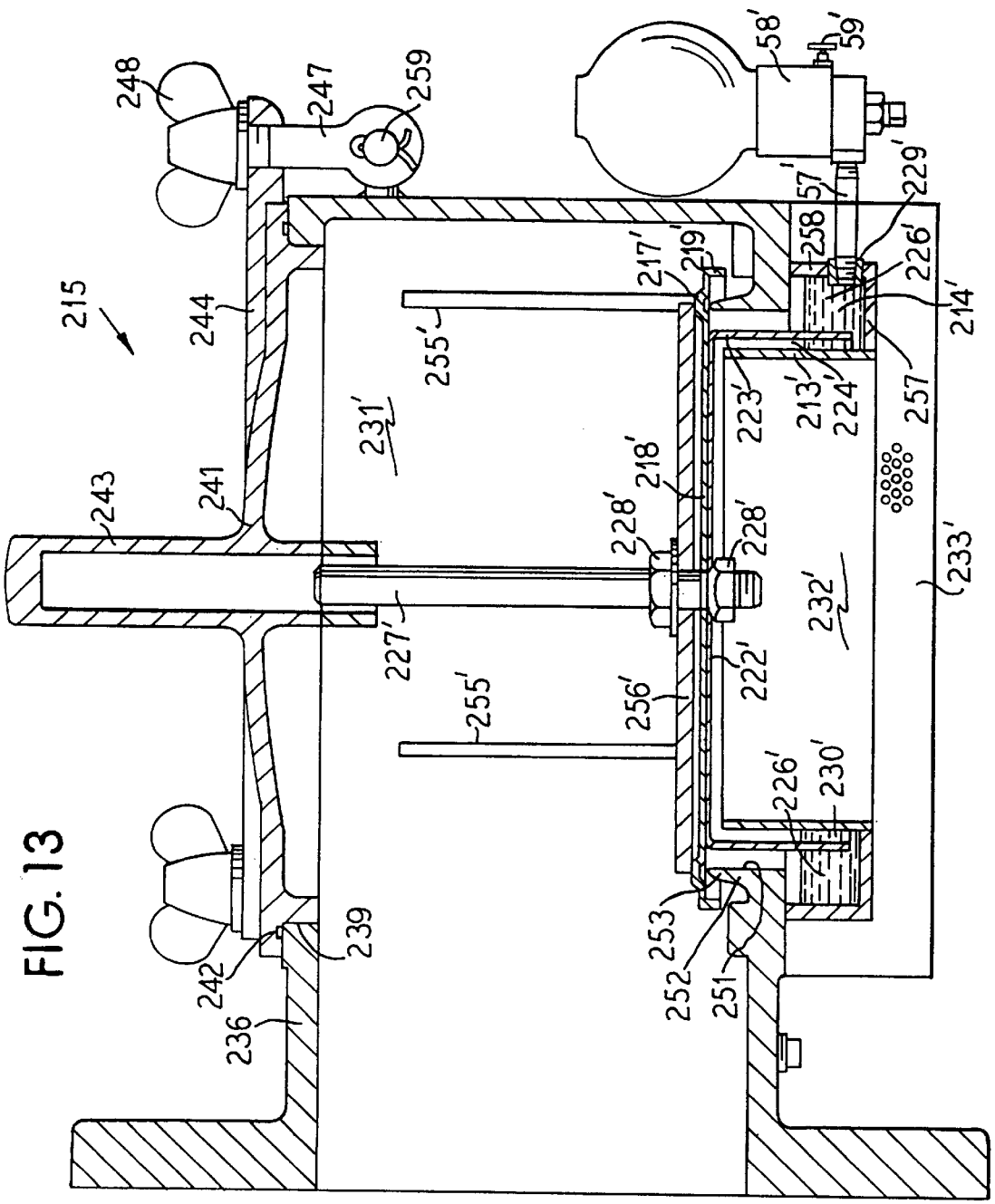
FIG. 13 is a view similar to FIG. 12, but showing a second embodiment of a subatmospheric pressure responsive vent valve structure of this invention.
Figure 14:
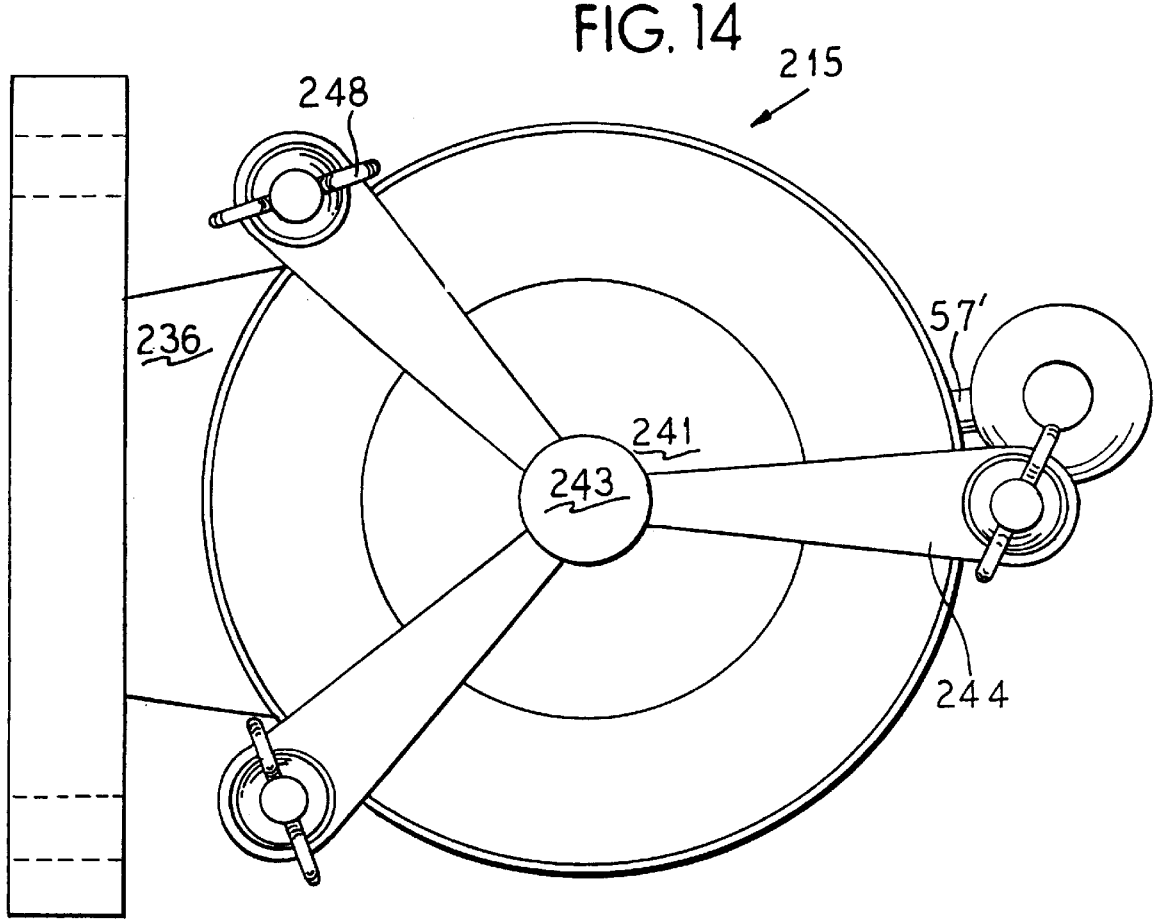
FIG. 14 is a top plan view of the valve embodiment shown in FIG. 15.
Figure 15:
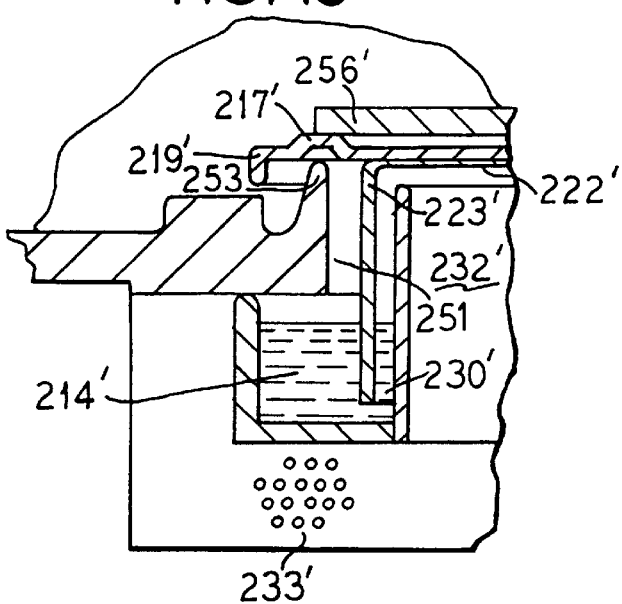
FIG. 15 is a enlarged fragmentary view of a portion of the FIG. 15 valve structure taken in the region of the liquid sealing valve showing details thereof.

Referring to FIGS. 13–15, there is seen a second embodiment 215 of a vent valve structure of the invention that is adapted for use with a tank operating at subatmospheric pressures.

Vent valve structure 215 has similarities in structure and operation to vent valve structure 195. For description convenience purposes, components of structure 215 which correspond with components of structure 195 are similarly numbered but with the addition of prime marks thereto for identification purposes. In structure 215, a housing 236 comprised of a cast and machined metal is provided which has an integral and generally horizontally extending connecting duct 237 that is terminally flanged for connection purposes. Connection to a tank or the like that is operating at subatmospheric pressures may be accomplished in a manner comparable to that above described for structure 195.

The housing 236 has a top aperture 239 that is fitted with a head cap 241 that is formed by casting and machining of metal. For sealing purposes, a peripherally adjacent area of head cap 241 is provided with a groove holding a circumferentially extending O-ring 242. The center of head cap 241 is provided with an integral upstanding tube 243 which is provided with an integral end cap. The head cap 241 is provided with three circumferentially spaced radially extending mounting ears 244 each of whose terminal ends is provided with a bore. Each bore is adapted to receive therethrough the threaded terminal end portion of an eyebolt 247. Each eyebolt 247 is provided with a wingnut 248 for holding each eyebolt 247 in engaged relationship with the head cap 241. Each eyebolt 247 is pivotally associated with an L-bar 259 that is here abuttingly associated with the adjacent side portion of the housing 236.

In opposed relationship to the top aperture 239, the bottom aperture 251 is provided in the housing 236. The perimeter region of the bottom aperture 251 is provided with an upstanding neck portion 252 that is upwardly tapered so as to define an upper end portion 253. The diaphragm 217' is adapted to seat upon the upper end portion 253.

A plurality of upstanding guide posts 255' (here illustratively four) are provided preferably in circumferentially equally spaced relationship relative to one another about and adjacent to the pallet plate 218'. Each post 255' is conveniently threaded at its lower end and engaged with a mating channel provided in the housing 236.

Here the reservoir 214' is defined by a sleeve 213', a bottom ring 257 and a sleeve 258, the sleeve 258 being radially outwardly spaced relationship to the sleeve 213'. Also the upper edge of the sleeve 258 is sealingly associated with a bottom portion of the housing 236 in radially adjacent relationship to the bottom aperture 251 by welding or the like.

As in the valve structure 195, here the pallet plate 218' and the bottom plate 222' are likewise associated with a centering and retaining rod 227 which is held by retaining nuts 228' and whose upper end extends into the tube 243. The operation of the apron 223' in relation to the reservoir 214' and the sealing liquid 230' is as described above in relation to valve structure 195. Supply of sealing liquid is similarly achieved with use of a supply vessel 58' and a valve 59' being associated with the reservoir 214' through the use of a nipple 57' that is threadably received through a wall hole of the reservoir 214'.

A screen 233' fits over bottom ring 257 and side portions of the sleeve 258 thereby the interior region where space 232' is maintained at atmospheric pressure. The space 231' over and above the normally closed diaphragm 217 and pallet plate 218' subassembly is normally at subatmospheric pressures during operation of an associated tank or the like.

As those skilled in the art will appreciate, in the valve structure 215, the surface of the liquid in the chamber 226' has reduced impact (or effect) upon the bottom side of the pallet plate 218 since the passageway between the surface of the liquid 230' and the bottom of the pallet plate 218 is substantially restricted compared to the structure associated with the structure 195. The advantage of this arrangement is that the force acting upon the bottom side of the pallet plate 218 from the chamber 226' is limited mainly to the pressure existing in the space 232' adjacent to the pallet plate 218 since the peripheral passageway 261 is small.

Figure 16:
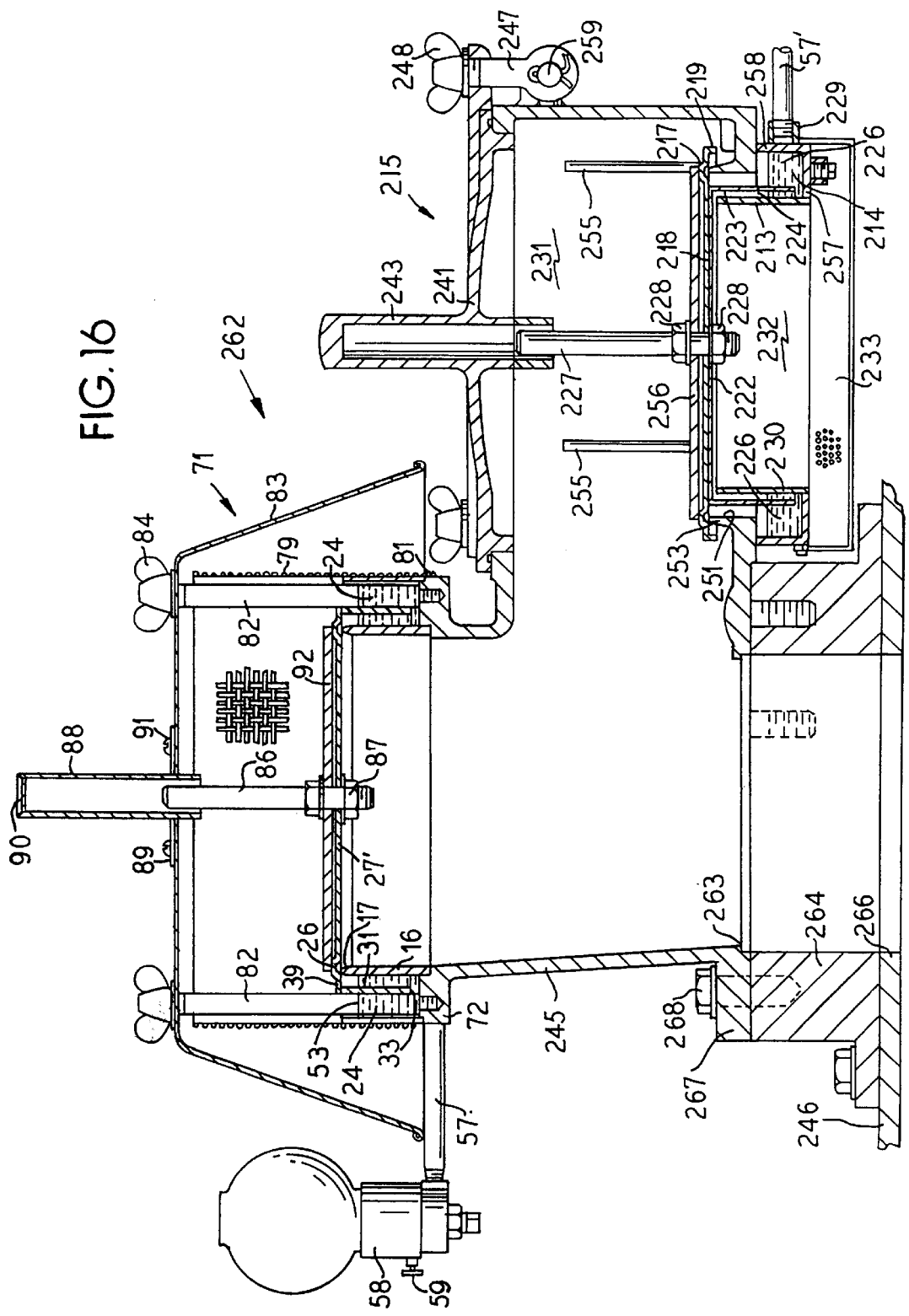
FIG. 16 is an axial and diametrical cross-sectional view taken through a cooperating and integrated assembly of a superatmospheric pressure-responsive vent valve structure of the invention with a subatmospheric pressure-responsive vent valve structure of the invention.

Referring to FIG. 16, there is seen a composite cooperating structure that incorporates each of the valve assemblies 71 and 215 (each described above). Here such valve structures are associated with a common modified T-connector 245. T-connector 245 replaces the housing 236 of the valve assembly 215 and the support flange 72 of the vent valve structure 71. The resulting composite structure is adapted for association with a tank operating at superatmospheric pressures and/or at subatmospheric pressures over a time period thereby to provide protection atmospheric and superatmospheric pressures. For purposes of connecting the bottom aperture 263 of the modified T-connector 245 to a tank 46, the bottom aperture 263 and a tank 46 are interconnected by a linking flange 264. A linking flange 264 circumferentially extends around an aperture 266 in the tank 246 and is mounted thereto by machine nuts 267. The body of the T-connector about the bottom aperture 263 is provided with a connecting flange 267 that is bolted to a flange 264 by a machine nuts 260.

Figure 17:
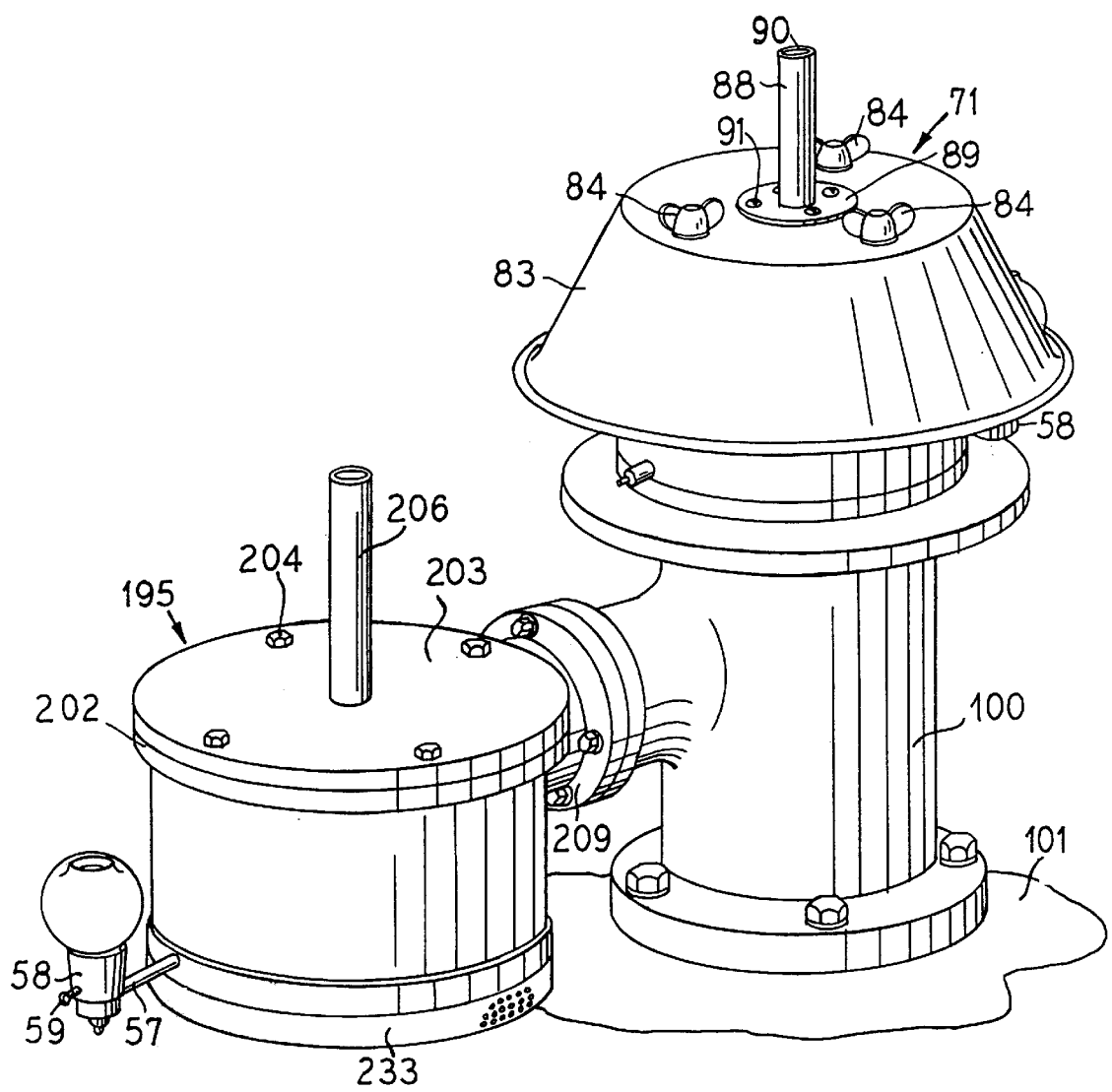
FIG. 17 is a view similar to FIG. 16, but showing a perspective view of an alternative embodiment of such a cooperating and integrated assembly.

Referring to FIG. 17, there is seen another cooperative combination of a vent valve structure 71 with a vent valve structure 195. Structure 71 and structure 195 are each connected with a T-connector 100 that is functionally connected with a tank 101.

In the practice of this invention, it is now preferred for the diaphragm and the pallet to be so associated that an air cushion or air space is provided between the diaphragm and adjacent portions of the pallet. Thus, a modified diaphragm and pallet structure, preferably with a vertical stem, such as shown in Lisciani U.S. Pat. No. 3,394,732 can be utilized.

As those of ordinary skill in the art will readily appreciate from the foregoing disclosures taken with the accompanying drawings, the present invention has a number of advantages and features.

In particular, the vent valve assemblies of this invention prevent fugitive vapor emissions from escaping to the atmosphere prior to valve opening at a set point pressure.

A vent valve assembly of this invention provides two independent sealing points. The weight-loaded pallet determines the set point of the vent valve. The liquid seal provides additional sealing up to its limiting pressure or vacuum set point.

The set point of a vent valve assembly of this invention can preferably be varied by changing the effective weight applied to its pallet assembly. A present preference is to select a set that ranges up to the maximum liquid column pressure equivalent; however, for certain applications the liquid seal opening pressure can be selected to be greater that the pallet/diaphragm opening pressure as those skilled in the art will readily appreciate.

In a vent valve assembly of this invention, a normally closed pressure chamber above the sealing liquid is defined in the reservoir by a cylindrical apron extension that is effectively a part of the pallet/diaphragm subassembly.

In a vent valve assembly of this invention, the liquid reservoir and the cylindrical apron extension are each sized and configured so that sealing liquid in a normally closed chamber associated with the reservoir is displaced by pressure but is contained in the reservoir until a set maximum liquid pressure is achieved. In effect, relative to the valve neck, a radially outer open chamber that is adjacent a normally closed chamber are defined in the reservoir by the cylindrical apron. The outer chamber preferably has a greater volume than the inner normally closed pressure chamber.

The primary vent valve seal that utilizes a diaphragm/pallet combination is independent of the liquid seal. If for any reason the reservoir is not charged with sealing liquid, or is inoperative, then the primary vent valve seal still function.

In a vent valve structure that is adapted for vacuum venting, the sealing liquid reservoir is preferably and conveniently isolated from the interior of the vent valve assembly by the primary valve seal. Then, if there is a tendency to develop moisture inside the vent, the reservoir is not directly contacted with such moisture.

It will be understood that this invention can be embodied in other specific forms without departing from the spirit, scope and essential characteristics thereof. The present teachings are illustrative and not restrictive. The scope of the invention is indicated by the appended claims rather than by the preceding description.

What is claimed is:

1. A vent valve assembly comprising in combination:
   a. a vent neck with opposed first and second end portions, said first end portion having a seating surface and said second end portion including means for mounting said vent neck;
   b. a wall defining in combination with said neck a sealing liquid reservoir extending circumferentially around said neck, said reservoir having an open end radially adjacent said first end portion;
   c. a diaphragm normally releasably seated against said first end portion;
   d. a pallet plate sealingly supporting said diaphragm, and normally extending across and closing said first end portion, said pallet including a downturned circumferentially extending apron located in radially adjacent relationship to both said vent neck and said wall, wherein a radial distance between said apron and said neck is not greater than a radial distance between said apron and said wall, said apron extending through said open end and into said reservoir, and said apron having a lower end; and
   e. means for applying a weighting force exteriorly against said pallet for achieving unseating of said diaphragm at a predetermined pressure in said neck;

whereby, when said reservoir is partially filled with a sealing liquid to a liquid level at least sufficient to immerse said lower end, a liquid sealed chamber is produced therein between said apron and said vent neck, and whereby, when vapor emissions pass between said one end portion and said diaphragm, said vapor emissions enter and are retained in said chamber until the pressure of said vapor emissions is sufficient to displace in said reservoir said sealing liquid from said sealed chamber and expose said lower end, thereby releasing said vapor emissions from said sealed chamber upwardly through said open end.

2. The valve assembly of claim 1 wherein said reservoir is so charged with said sealing liquid and wherein the resulting said liquid level is sufficient to achieve a maximum liquid seal in said sealed chamber which is at least equal to said diaphragm unseating pressure.

3. A vent valve assembly comprising in combination:
   a. a vent neck with opposed first and second ends, said first end defining a seating surface and said second end including means for mounting said vent neck;
   b. a wall defining member which circumferentially and continuously extends exteriorly about said vent neck and which in vertical section defines a base portion and an interconnected upstanding portion, said base portion being terminally and circumferentially connected to said vent neck in longitudinally spaced relationship to said first end, including connecting means therefor, and said upstanding portion extending circumferentially in radially outwardly spaced relationship relative to said vent neck, whereby said wall defining member and said vent neck cooperate to define a sealing liquid reservoir located around said vent neck, said reservoir having an open upper end;
   c. a diaphragm normally releasably seated against said seating surface;
   d. a pallet plate sealingly supporting said diaphragm in overlying relationship, and said pallet plate extending diametrically across said one end so that in combination with said diaphragm said pallet plate normally closes said first end, said pallet plate projecting radially outwards beyond said neck, and including a downturned peripheral circumferentially extending apron that extends into said reservoir through said open end between said vent neck and said upstanding portion in radial relation thereto, said apron having a lower end that terminates above said base portion leg, wherein a radial distance between said apron and said neck is not greater than a radial distance between said apron and said upstanding portion;
   e. means for applying a sealing force against exterior surface portions of said pallet plate with said diaphragm so seated so that, when a predetermined pressure in said neck is reached, said diaphragm is unseated and said first end is opened;

whereby, when said reservoir is charged with said sealing liquid to a level at least sufficient to immerse said lower end, a liquid sealed chamber is produced which is defined by respective adjacent portions of said sealing liquid, said neck, said pallet plate, said diaphragm, and said apron; and whereby, when vapor emissions from inside said neck pass between said one end and said diaphragm, said vapor emissions are retained in said sealed chamber until the pressure of said vapor emissions is sufficient to displace said sealing liquid from said sealed chamber and expose said lower terminus, thereby releasing said vapor emissions from said sealed chamber upwardly between said apron and said upstanding leg.

4. The valve assembly of claim 3 wherein said reservoir is so charged with said sealing liquid and wherein the resulting said liquid level is sufficient to achieve a maximum liquid seal pressure in said sealed chamber which is at least equal to said diaphragm unseating pressure.

5. The valve assembly of claim 3 which further includes sealing liquid supply means for maintaining said level.

6. The valve assembly of claim 3 wherein said base portion and said interconnected upstanding portion define an L-configured member functionally associated with a sight glass.

7. The valve assembly of claim 3 wherein said reservoir is associated with a sealing liquid drain cock.

8. The valve assembly of claim 3 wherein said neck is cylindrically configured.

9. The valve assembly of claim 3 wherein said reservoir is associated with a sight glass.

10. A vent valve assembly comprising in combination:
  a. a vent neck with opposed first and second ends, said first end defining a seating surface and said second end including means for mounting said vent neck;
  b. a wall defining member which circumferentially and continuously extends exteriorly about said vent neck and which in vertical section defines a base portion and an interconnected upstanding portion, said base portion being terminally and circumferentially connected to said vent neck in longitudinally spaced relationship to said first end, including connecting means therefor, and said upstanding portion extending circumferentially in radially outwardly spaced relationship relative to said vent neck, whereby said wall defining member and said vent neck cooperate to define a sealing liquid reservoir located around said vent neck, said reservoir having an open upper end;
  c. a diaphragm normally releasably seated against said seating surface;
  d. a pallet plate sealingly supporting said diaphragm in overlying relationship, and said pallet plate extending diametrically across said one end so that in combination with said diaphragm said pallet plate normally closes said first end, said pallet plate projecting radially outwards beyond said neck, and including a down-turned peripheral circumferentially extending apron that extends into said reservoir through said open end between said vent neck and said upstanding portion, said apron having a lower end that terminates above said base portion leg;
  e. means for applying a sealing force against exterior surface portions of said pallet plate with said diaphragm so seated so that, when a predetermined pressure in said neck is reached, said diaphragm is unseated and said first end is opened;
  f. a hood that extends over and across said pallet plate, said diaphragm, and said upstanding leg and that includes a medial aperture through which a stem extends so that said hood is clamped adjacent said pallet plate by a nut;

whereby, when said reservoir is charged with said sealing liquid to a level at least sufficient to immerse said lower end, a liquid sealed chamber is produced which is defined by respective adjacent portions of said sealing liquid, said neck, said pallet plate, said diaphragm, and said apron; and whereby, when vapor emissions from inside said neck pass between said one end and said diaphragm, said vapor emissions are retained in said sealed chamber until the pressure of said vapor emissions is sufficient to displace said sealing liquid from said sealed chamber and expose said lower terminus, thereby releasing said vapor emissions from said sealed chamber upwardly between said apron and said upstanding leg.

11. A vent valve assembly comprising in combination:
  a. a vent neck with opposed first and second ends, said first end defining a seating surface and said second end including means for mounting said vent neck;
  b. a wall defining member which circumferentially and continuously extends exteriorly about said vent neck and which in vertical section defines a base portion and an interconnected upstanding portion, said base portion being terminally and circumferentially connected to said vent neck in longitudinally spaced relationship to said first end, including connecting means therefor, and said upstanding portion extending circumferentially in radially outwardly spaced relationship relative to said vent neck, whereby said wall defining member and said vent neck cooperate to define a sealing liquid reservoir located around said vent neck, said reservoir having an open upper end;
  c. a diaphragm normally releasably seated against said seating surface;
  d. a pallet plate sealingly supporting said diaphragm in overlying relationship, and said pallet plate extending diametrically across said one end so that in combination with said diaphragm said pallet plate normally closes said first end, said pallet plate projecting radially outwards beyond said neck, and including a down-turned peripheral circumferentially extending apron that extends into said reservoir through said open end between said vent neck and said upstanding portion, said apron having a lower end that terminates above said base portion leg, wherein said pallet plate includes a top plate and an adjacent bottom plate, wherein said top plate includes on its bottom surface a peripherally adjacent depression wherein said diaphragm is positioned, and further includes said apron, and wherein said bottom plate is disposed generally within and across a portion of said one end, wherein a stem extends through said bottom plate and said top plate;
  e. means for applying a sealing force against exterior surface portions of said pallet plate with said diaphragm so seated so that, when a predetermined pressure in said neck is reached, said diaphragm is unseated and said first end is opened, wherein sealing means is included for preventing escape of said vapor emissions between said stem and said pallet plate when a nut is so threadably engaged with said stem;

whereby, when said reservoir is charged with said sealing liquid to a level at least sufficient to immerse said lower end, a liquid sealed chamber is produced which is defined by respective adjacent portions of said sealing liquid, said neck, said pallet plate, said diaphragm, and said apron; and whereby, when vapor emissions from inside said neck pass between said one end and said diaphragm, said vapor emissions are retained in said sealed chamber until the pressure of said vapor emissions is sufficient to displace said sealing liquid from said sealed chamber and expose said lower terminus, thereby releasing said vapor emissions from said sealed chamber upwardly between said apron and said upstanding leg.

12. A method for regulating low level fugitive vapor emissions from a vent neck, said method comprising the steps of:

a. associating said vent neck with a pallet and diaphragm type valve so that said vent neck and said valve cooperate to produce a seat zone that normally closes said vent neck;

b. applying a weighting force to said valve which causes said seat zone to unseat and thereby open said valve when a predetermined pressure occurs in said vent neck; and c. locating a liquid reservoir defined by a wall circumferentially around said vent neck and positioning in a liquid of said liquid reservoir the lower end portion of an apron that circumferentially extends around said vent neck and that downwardly depends from the pallet into the liquid of said liquid reservoir so that a normally closed chamber exists between said apron and said vent neck when said seat zone exists, wherein a radial distance between said apron and said neck is not greater than a radial distance between said apron and said wall;

whereby all of said fugitive vapor emissions that escape past said seat zone when said zone exists are retained in said closed chamber until either said predetermined pressure is reached or the pressure in said closed chamber becomes sufficient to expose said lower end portion.

13. A vent valve assembly comprising in combination:

a. a vent neck with opposed first and second end portions, said first end portion having a seating surface and said second end portion including mounting;

b. a wall in spaced relationship with an inner surface of said neck and defining in combination with said neck a sealing liquid reservoir extending inside said neck, said reservoir having an open end radially adjacent said first end portion;

c. a diaphragm normally releasably seated against said first end portion;

d. a pallet plate sealingly supporting said diaphragm, and normally extending across and closing said first end portion, said pallet including a downturned circumferentially extending apron located in radially adjacent relationship to both said vent neck and said wall, wherein a radial distance between said apron and said neck is at least equal to a radial distance between said apron and said wall, said apron extending through said open end and into said reservoir, and said apron having a lower end; and e. means for applying a weighting force exteriorly against said pallet for achieving unseating of said diaphragm at a predetermined pressure in said neck;

whereby, when said reservoir is partially filled with a sealing liquid to a liquid level at least sufficient to immerse said lower end, a liquid sealed chamber is produced therein between said apron and said vent neck, and whereby, when vapor emissions pass between said one end portion and said diaphragm, said vapor emissions enter and are retained in said chamber until the pressure of said vapor emissions is sufficient to displace in said reservoir said sealing liquid from said sealed chamber and expose said lower end, thereby releasing said vapor emissions from said sealed chamber upwardly through said open end.

* * * * *